United States Patent
Naamad

(10) Patent No.: US 8,954,381 B1
(45) Date of Patent: Feb. 10, 2015

(54) DETERMINING DATA MOVEMENTS IN A MULTI-TIERED STORAGE ENVIRONMENT

(71) Applicant: Amnon Naamad, Brookline, MA (US)

(72) Inventor: Amnon Naamad, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 309 days.

(21) Appl. No.: 13/628,918

(22) Filed: Sep. 27, 2012

(51) Int. Cl.
*G06F 17/30* (2006.01)

(52) U.S. Cl.
USPC .......................................................... 707/609

(58) Field of Classification Search
USPC .................. 707/609, 626, 637; 711/117
See application file for complete search history.

(56) References Cited

U.S. PATENT DOCUMENTS

| | | | |
|---|---|---|---|
| 7,506,012 B2 * | 3/2009 | Nishikawa et al. ............... | 1/1 |
| 7,949,637 B1 * | 5/2011 | Burke ............................ | 707/655 |
| 8,433,848 B1 * | 4/2013 | Naamad et al. ................ | 711/114 |
| 8,566,553 B1 | 10/2013 | Marshak | |
| 8,583,838 B1 * | 11/2013 | Marshak et al. ................ | 710/18 |
| 2006/0218364 A1 * | 9/2006 | Kitamura ....................... | 711/162 |
| 2009/0070541 A1 | 3/2009 | Yochai | |
| 2012/0221521 A1 * | 8/2012 | Chiu et al. ..................... | 707/622 |
| 2013/0312005 A1 * | 11/2013 | Chiu et al. ..................... | 718/105 |

OTHER PUBLICATIONS

U.S. Appl. No. 12/924,361, filed Sep. 24, 2010.
U.S. Appl. No. 13/466,775, filed May 8, 2012.

* cited by examiner

*Primary Examiner* — Hung T Vy
(74) *Attorney, Agent, or Firm* — Muirhead and Saturnelli, LLC

(57) ABSTRACT

Techniques are described for determining data movements. Gradient sets are determined for storage tiers. Each gradient set is associated with one of the storage tiers and includes at least one gradient. Based on the gradient sets, a donor tier and a first set of one or more receiving tiers are selected from the plurality of storage tiers. A first data portion having data currently stored on at least one physical device of the donor tier is selected. In accordance with data movement criteria, a second data portion included in a receiving tier of the first set is selected. Selecting the second data portion includes modeling a first data movement including moving the first data portion from the donor tier to the receiving tier. The first data movement may be included in a recommended list and may be performed by a data storage optimizer.

20 Claims, 19 Drawing Sheets

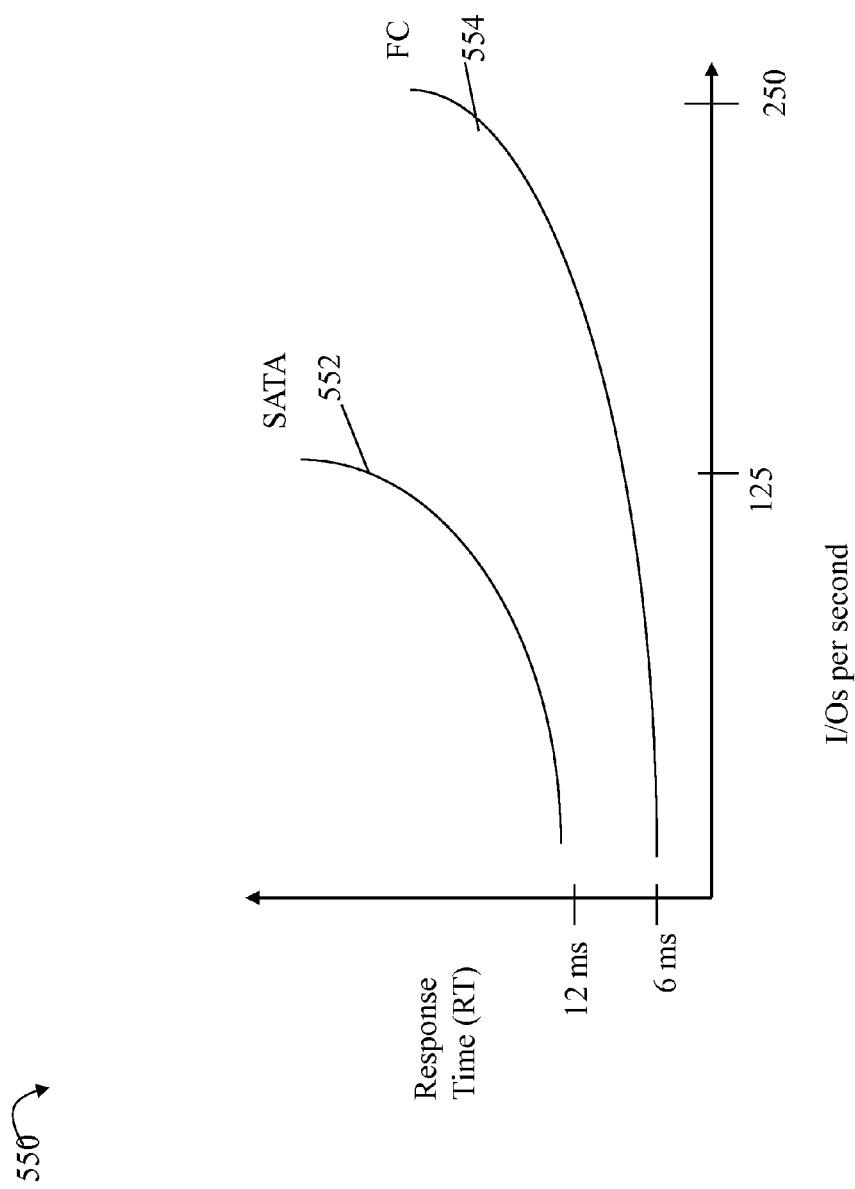

DETERMINING DATA MOVEMENTS IN A MULTI-TIERED STORAGE ENVIRONMENT

BACKGROUND

1. Technical Field

This application generally relates to data storage, and more particularly to techniques used in connection with determining and performing data movements in a multi-tiered storage environment.

2. Description of Related Art

Computer systems may include different resources used by one or more host processors. Resources and host processors in a computer system may be interconnected by one or more communication connections. These resources may include, for example, data storage deices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

SUMMARY OF THE INVENTION

In accordance with one aspect of the invention is a method of determining data movements comprising: calculating a plurality of gradient sets for a plurality of storage tiers, wherein each of the plurality of gradient sets is associated with one of the plurality of storage tiers and includes at least one gradient for said one storage tier; selecting, based on the plurality of gradient sets, a donor tier from the plurality of storage tiers; selecting, based on the plurality of gradient sets, a first set of one or more receiving tiers from the plurality of storage tiers; selecting a first data portion of the donor tier; selecting, in accordance with data movement criteria, a second data portion included in a receiving tier of the first set wherein said selecting the second data portion comprises modeling a first data movement including moving the first data portion from the donor tier to the receiving tier; and performing the first data movement. The first data portion may be a data portion for an application having its data stored on the plurality of storage tiers and said data movement criteria may include a first goal identifying a response time goal for any of the application and a data storage system including the plurality of tiers. The response time goal may identify a threshold response time, and wherein modeling the first data movement may include determining a modeled application response time that simulates a response time for the application with respect to data of the application stored on any of the plurality of storage tiers, and wherein said selecting the second data portion includes determining whether the modeled application response time is an improvement with respect to the response time goal and with respect to a current application response time denoting a response time without performing the first data movement. The response time goal may identify a response time goal for the data storage system, and wherein modeling the first data movement includes determining a modeled data storage system response time that simulates a response time for the data storage system, and wherein said selecting the second data portion may include determining whether the modeled data storage system response time is an improvement with respect to the response time goal for the data storage system and with respect to a current data storage system response time denoting a response time for the data storage system without performing the first data movement. The data movement criteria may include determining whether a first set of one or more workload characteristics of any of the donor tier and the first data portion match a second set of one or more characteristics preferred for the receiving tier. The first set of one or more workload characteristics may include any of whether write activity of the first data portion is above a threshold level, whether read activity of the first data portion is above a threshold level, and whether activity of the first data portion identifies any of a sequential read or write pattern. The method may include ranking relative activity levels of at least some of the data portions currently stored in the donor tier based on decreasing activity level associated with each of the at least some data portions, said at least some data portions including the first data portion. The ranking may rank any of read activity data and write activity data of the at least some data portions. Each of the plurality of gradient sets associated with one of the plurality of storage tiers may include any of a first gradient denoting a change in response time across said plurality of storage tiers with respect to an increase in read activity in said one storage tier by a specified amount, a second gradient denoting a change in response time across said plurality of storage tiers with respect to a decrease in read activity in said one storage tier by a specified amount, a third gradient denoting a change in response time across said plurality of storage tiers with respect to an increase in write activity in said one storage tier by a specified amount, and a fourth gradient denoting a change in response time across said plurality of storage tiers with respect to a decrease in write activity in said one storage tier by a specified amount. Modeling the first data movement of the first data portion from the donor tier to the receiving tier may include modeling movement of first read activity data and first write activity data of the first data portion to the receiving tier using a first of the plurality of gradient sets associated with the donor tier and a second of the plurality of gradient sets associated with the receiving tier. The first set of one or more receiving tiers may include at least two of the plurality of tiers and wherein selecting the second data portion from a receiving tier of the first set may include modeling data movement of the first data portion from the donor tier to each of the tiers in the first set. The first data movement may include moving the second data portion from the receiving tier to the donor tier and modeling the first data movement may include modeling movement of the second data portion from the receiving tier to the donor tier. Performing the first data movement may include moving the second data portion from the receiving tier to the donor tier. The method may include ranking relative activity levels of at least some of the data portions currently stored in the receiving tier based on increasing activity level associated with each of the at least some data portions, said at least some data portions including the second data portion, and wherein the ranking may rank any of read activity data and write activity data of the at least some data portions. Each of the plurality of gradient sets associated with one of the plurality of storage tiers may include any of a first gradient denoting a change in response time across said plurality of storage tiers with respect to an increase in read activity in said each storage tier by a specified amount, a second gradient denoting a change in response time across said plurality of storage tiers with respect to a decrease in read activity in said each storage tier by a specified amount, a third gradient denoting a change in response time across said plurality of storage tiers with respect to an increase in write activity in said each storage tier by a specified amount, and a fourth gradient denoting a change in response time across said plurality of storage tiers with respect to a decrease in write activity in said each storage tier by a specified amount. Modeling the first data movement may include modeling movement of first read activity data and first write activity data of the first data portion to the receiving tier and modeling movement of second read activity data and second write activity data of the second data portion to the donor tier. Modeling the first data movement may use a first of the plurality of gradient sets associated with the donor tier and a second of the plurality of donor sets associated with the receiving tier. The second data portion may be an empty data portion denoting an unused amount of physical storage of the receiving tier having no I/O activity.

In accordance with another aspect of the invention is a data storage system comprising: a plurality of storage tiers; a plurality of physical devices, wherein each of the plurality of storage tiers includes a different portion of the plurality of physical devices; a computer readable medium comprising code stored thereon for determining a list of one or more data movements, the computer readable medium comprising code stored thereon for: calculating a plurality of gradient sets for the plurality of storage tiers, wherein each of the plurality of gradient sets is associated with one of the plurality of storage tiers and includes at least one gradient for said each storage tier; selecting, based on the plurality of gradient sets, a donor tier from the plurality of storage tiers; selecting, based on the plurality of gradient sets, a first set of one or more receiving tiers from the plurality of storage tiers; selecting a first data portion having data currently stored on at least one physical device of the donor tier; and selecting, in accordance with data movement criteria a second data portion included in a receiving tier of the first set, wherein said selecting the second data portion includes modeling a first data movement including moving the first data portion from the donor tier to the receiving tier and moving the second data portion from the receiving tier to the donor tier, wherein said first data movement is included in said list. The list of one or more data movements may be used by a data storage optimizer to perform data movement optimizations in accordance with the list. The donor tier may be designated as a tier that prefers to donate at least one of reads and writes. Each of the receiving tiers in the first set may be designated as tier that prefers to receive at least one of reads and writes. The data movement criteria may include one or more goal criteria. The goal criteria may comprise any of a response time goal, an availability goal, and a storage capacity goal. The donor tier may be designated as donor of one of read activity and write activity thereby indicating that the donor tier has excessive workload of said one of read activity and write activity. The donor tier may have a steepest gradient of all others of said plurality of tiers with respect to gradients in said plurality of gradient sets associated with said one of read activity and write activity. A first of the plurality of gradient sets associated with the donor tier and a second of the plurality of gradient sets associated with the receiving tier may be used in modeling the first data movement.

In accordance with another aspect of the invention is a computer readable medium comprising code stored thereon for determining a list of one or more data movements, the computer readable medium comprising code stored thereon for: calculating a plurality of gradient sets for a plurality of storage tiers, wherein each of the plurality of gradient sets is associated with one of the plurality of storage tiers and includes at least one gradient for said each storage tier; selecting, based on the plurality of gradient sets, a donor tier from the plurality of storage tiers; selecting, based on the plurality of gradient sets, a first set of one or more receiving tiers from the plurality of storage tiers, selecting a first data portion having data currently stored on at least one physical device of the donor tier; and selecting, in accordance with data movement criteria, a second data portion included in a receiving tier of the first set, wherein said selecting the second data portion includes modeling a first data movement including moving the first data portion from the donor tier to the receiving tier and moving the second data portion from the receiving tier to the donor tier, wherein said first data movement is included in said list.

BRIEF DESCRIPTION OF THE DRAWINGS

Features and advantages of the present invention will become more apparent from the following detailed description of exemplary embodiments thereof taken in conjunction with the accompanying drawings in which:

FIGS. 10, 11A and 11B are examples of performance curves that may be used to model device response time in an embodiment in accordance with techniques herein;

DETAILED DESCRIPTION OF EMBODIMENT(S)

Figure 1:
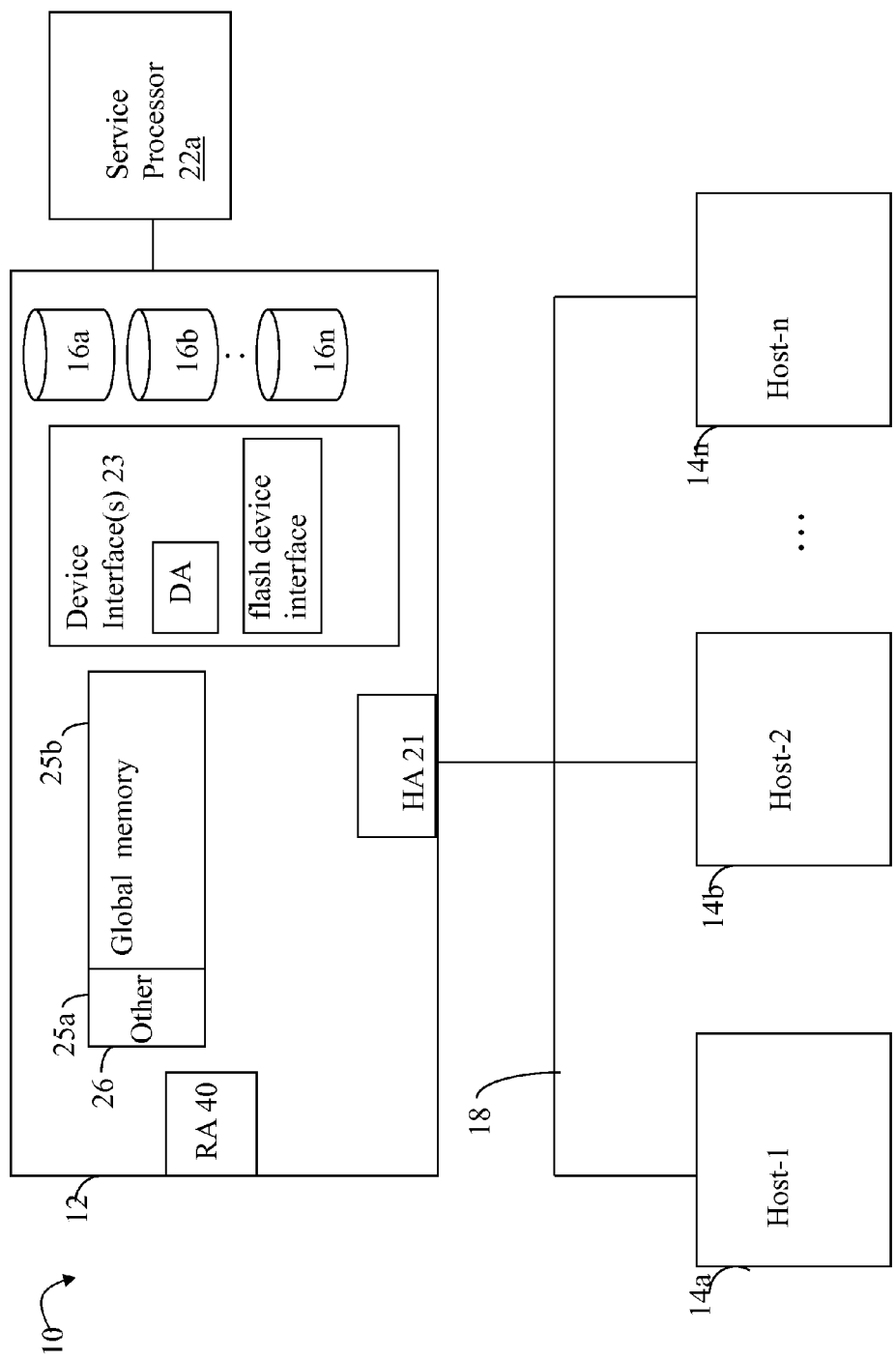
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area.

Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
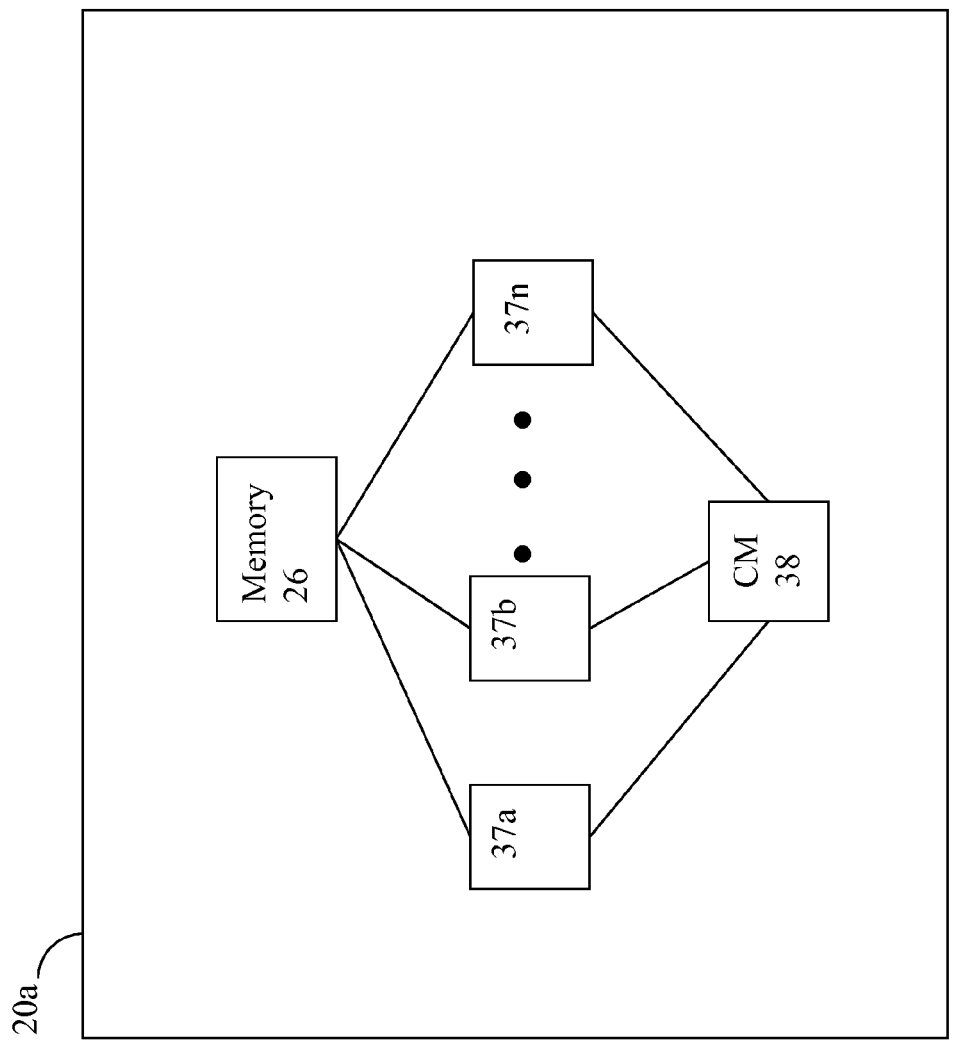
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. Iii addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ or VMAX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC disk drive, a SATA (Serial Advanced Technology Attachment) drive), and the like. Data protection may specify a type or level of data storage protection such, for example, as a particular RAID level (e.g., RAID1, RAID-5 3+1, RAID5 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

Figure 3:
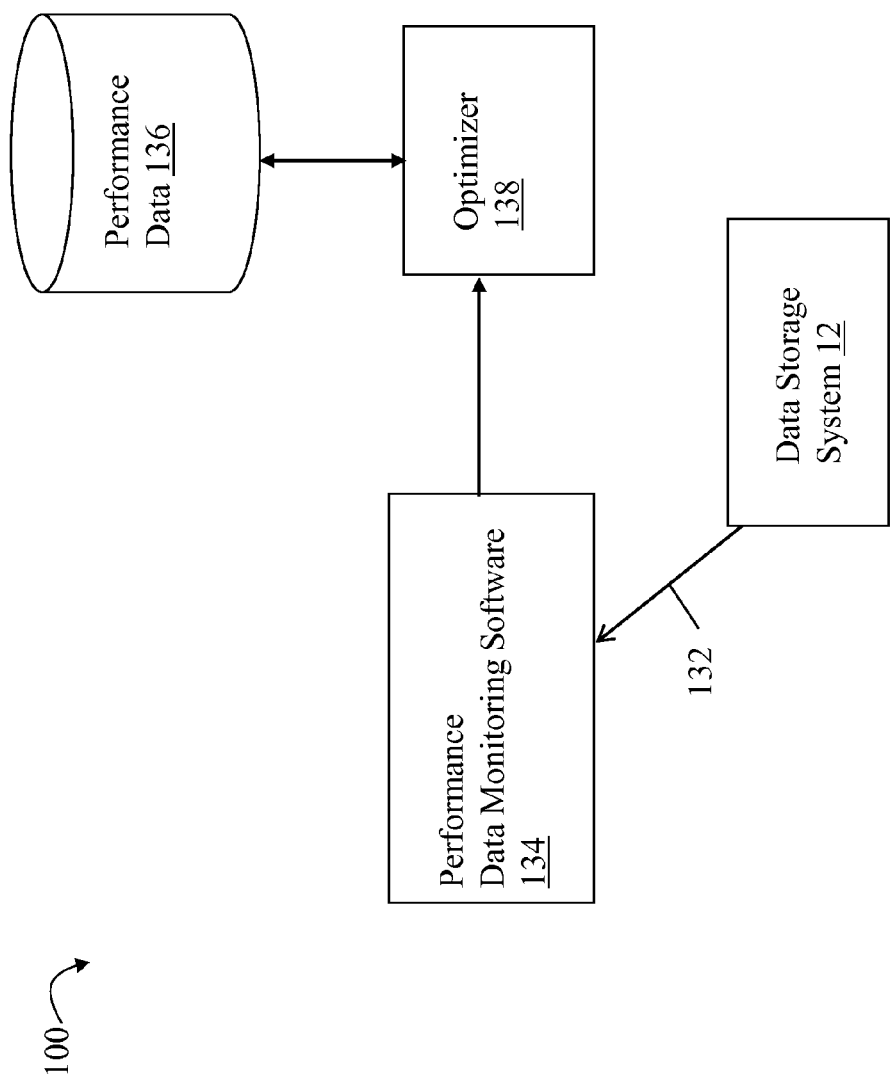
FIG. 3 is an example representing components that may be included in a service processor in an embodiment in accordance with techniques herein.

Referring to FIG. 3, shown is an example 100 of software that may be included in a service processor such as 22a. It should be noted that the service processor may be any one of a variety of commercially available processors, such as an Intel-based processor, and the like. Although what is described herein shows details of software that may reside in the service processor 22a, all or portions of the illustrated components may also reside elsewhere such as, for example, on any of the host systems 14a 14n.

Included in the service processor 22a is performance data monitoring software 134 which gathers performance data about the data storage system 12 through the connection 132. The performance data monitoring software 134 gathers and stores performance data and forwards this to the optimizer 138 which further stores the data in the performance data file 136. This performance data 136 may also serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 136 may be used by the optimizer to determine metrics described and used in connection with techniques herein. The optimizer may access the performance data, for example, collected for a plurality of LVs when performing a data storage optimization. The performance data 136 may be used in determining a workload for one or more physical devices, logical devices or volumes (LVs) serving as data devices, thin devices (described in more detail elsewhere herein) or other virtually provisioned devices, portions of thin devices, and the like. The workload may also be a measurement or activity level of "how busy" a device is, for example, in terms of I/O operations (e.g., I/O throughput such as number of I/Os/second, response time (RT), and the like).

The response time for a storage device or volume may be based on a response time associated with the storage device or volume for a period of time. The response time may based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the operations of read and write with respect to an LV, thin device, and the like, may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular types of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an HA 21.

The optimizer 138 may perform processing using techniques herein set forth in following paragraphs to determine which data portions of one or more applications to locate on physical storage devices in a multi-tiered environment. It should be noted that the optimizer 138 may generally represent one or more components that perform processing as described herein as well as one or more other optimizations and other processing that may be performed in an embodiment.

Described in following paragraphs are techniques that may be performed in selecting data portions for data movement between storage tiers in accordance with one or more goal criteria. Techniques herein may be performed by an optimizer such as the data storage optimize described elsewhere herein in order to determine how to optimally locate data portions in the different storage tiers. In some embodiments, the data portions may be data portions of thin or virtually provisioned devices (described elsewhere herein) although techniques herein may generally be used in connection with any suitable type of device. Such techniques may be used in determining what data portions of thin devices to store on physical devices of a particular tier in a multi-tiered storage environment. Such data portions of a thin device may be automatically placed in a storage tier where the techniques herein have determined the storage tier is best to service that data in order to meet one or more goal criteria. In some embodiments, such criteria may include an overall application response time (e.g., across multiple storage tiers used by the application). The data portions may also be automatically relocated to a different storage tier as the work load and observed performance characteristics for the data portions change over time.

As an exemplary multi-tiered storage environment, the techniques herein may be described with reference to a storage environment having three storage tiers—a first tier of only flash drives in the data storage system, a second tier of only FC disk drives, and a third tier of only SATA disk drives. In terms of performance, the foregoing three tiers may be ranked from highest to lowest as follows: first, second, and then third. The lower the tier ranking, the lower the tier's performance characteristics (e.g., longer latency times, capable of less I/O throughput/second/GB (or other storage unit), and the like). Generally, different types of physical devices or physical drives have different types of characteristics. There are different reasons why one may want to use one storage tier and type of drive over another depending on criteria, goals and the current performance characteristics exhibited in connection with performing I/O operations. Some measure of workload may be used as a factor or criterion in combination with others described herein for determining what data portions are located on the physical storage devices of each of the different storage tiers. Workload may be determined using some measure of I/O intensity, performance or activity (e.g., I/O throughput/second, percentage of read operation, percentage of write operations, response time, etc.) with respect to a data portion, or more generally, an application's data.

Although exemplary data storage environments herein may be described using a particular number of tiers, more generally the techniques herein may be used with any desired number of storage tiers. Additionally, although such tiers may be ranked relative to one another based on performance, such ranking is not required. In other words, an embodiment in accordance with techniques herein may not have such knowledge or information regarding the relative performance of the different storage tiers and techniques herein may be performed without such knowledge. More specifically, the technique herein may be used in an embodiments to support any number and any type of tiers in the same policy, and efficiently determine what data portions to located on different physical devices of the different storage tiers based on given policy, rules, and goals. Techniques herein take into account, for example, that certain tiers are better suited for write operations or read operations, or that certain tiers are more suited for sequential operations than others. Techniques herein may also be used to take into account the activity level at each tier and certain characteristics of the workload, such as inter-arrival distributions of I/Os, which may be observed through actual measured response time.

Prior to describing such techniques, following paragraphs provide an initial and more detailed discussion of a multi-tiered storage environment and thin or virtually provisioned devices as well as different policies, statistics and performance curves that may be used in an embodiment in connection with such techniques.

Figure 4:
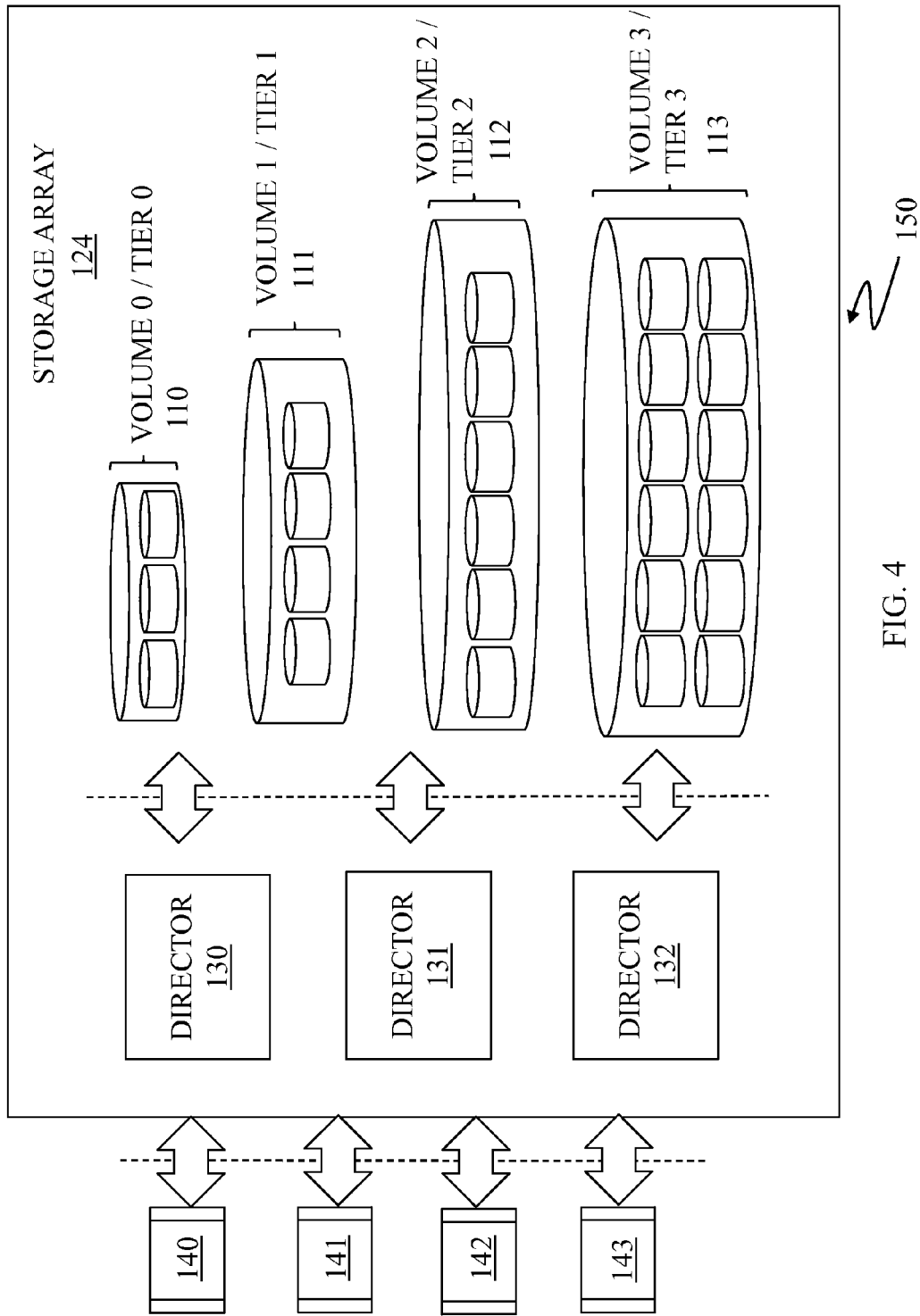
FIGS. 4, 5A and 5B are examples illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage volumes (LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies (e.g., allocation policies, data movement policies including promotion and demotion thresholds, and the like) to transparently automate the control, placement, and movement of data within a storage system based on business needs. The techniques herein may be used to determine amounts or allocations of each storage tier used by each application based on capacity limits in combination with performance limits.

Figure 5A:
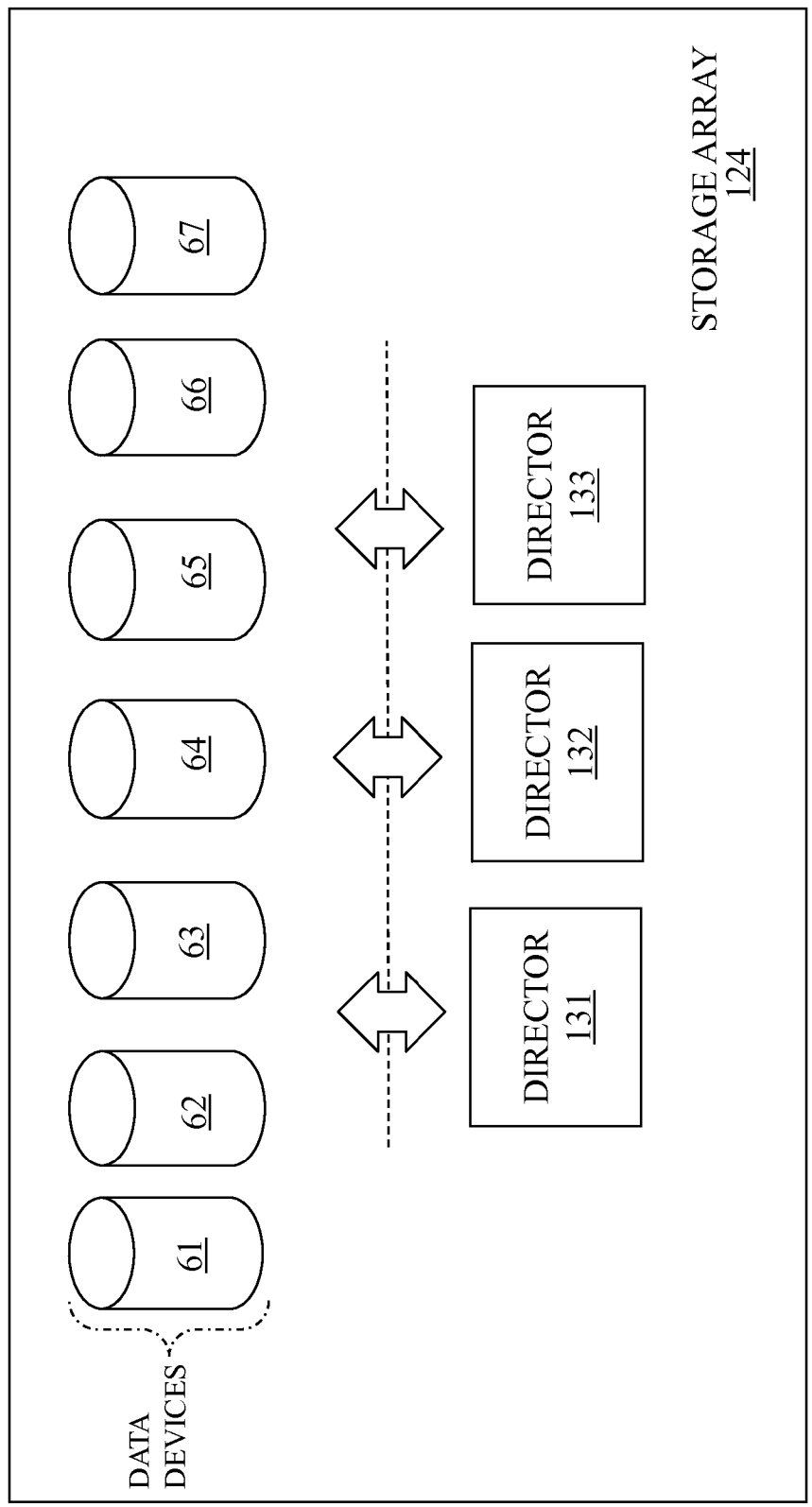

Referring to FIG. 5A, shown is a schematic diagram of the storage array 124 as including a plurality of data devices 61-67 communicating with directors 131-133. The data devices 61-67 may be implemented as logical devices like standard logical devices (also referred to as thick devices) provided in a Symmetrix® data storage device produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more of the disk drives 42-44 (or more generally physical devices). Thus, for example, the data device section 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-67 may be sections of one data device.

Figure 5B:
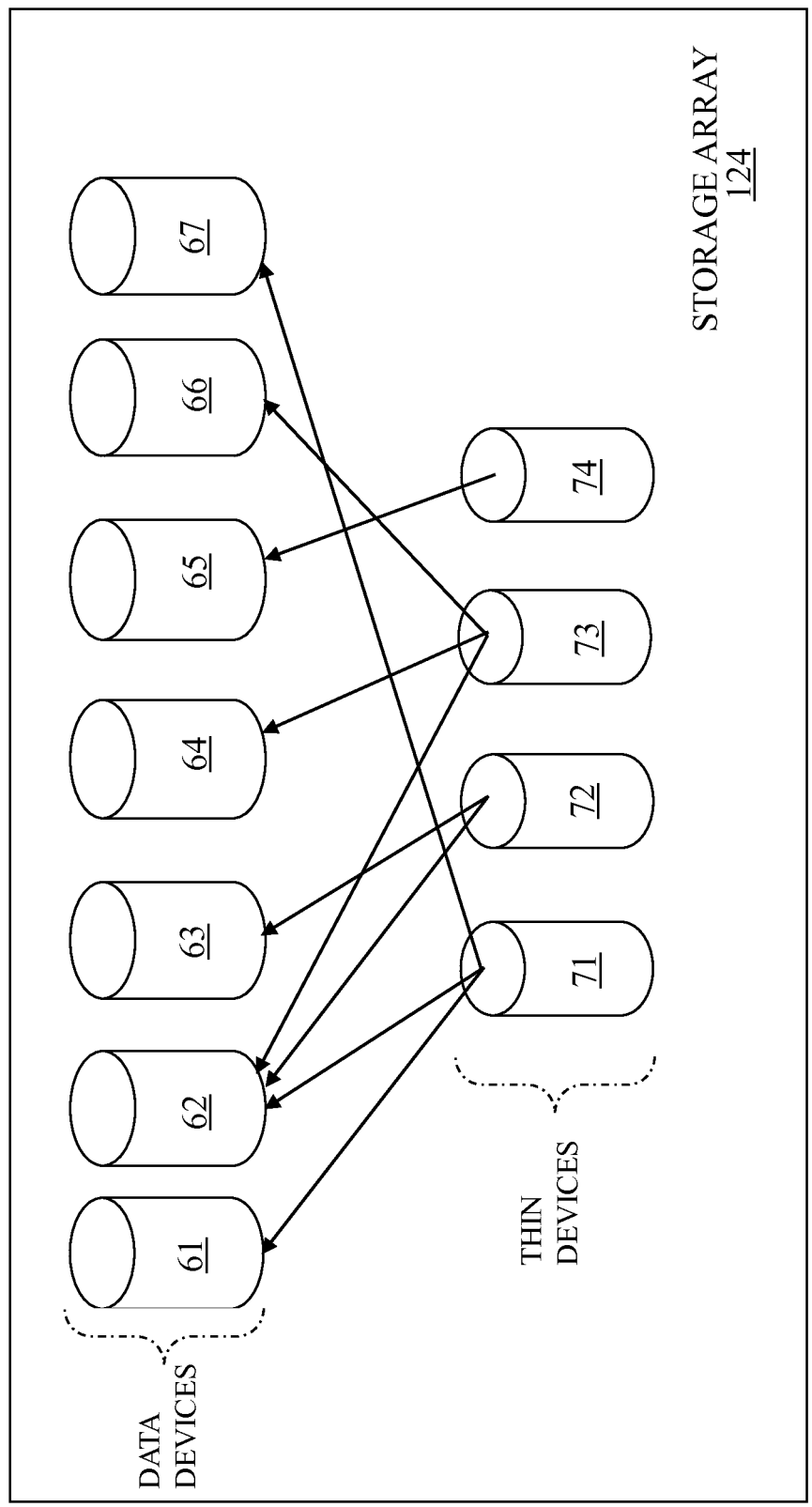
Figure 5C:
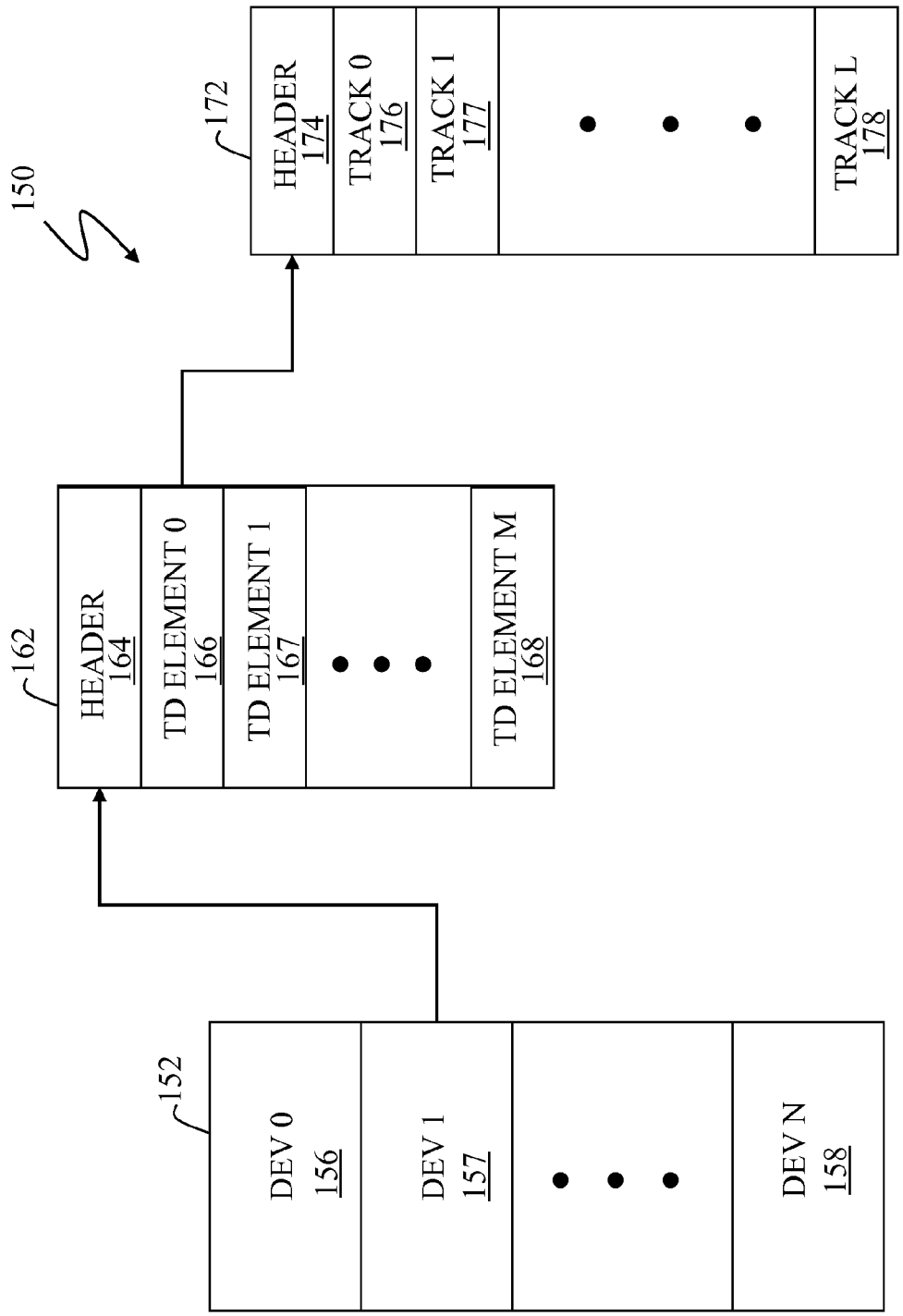
FIG. 5C is a schematic diagram illustrating tables that are used to keep track of device information in connection with an embodiment of the system described herein.
Figure 5D:
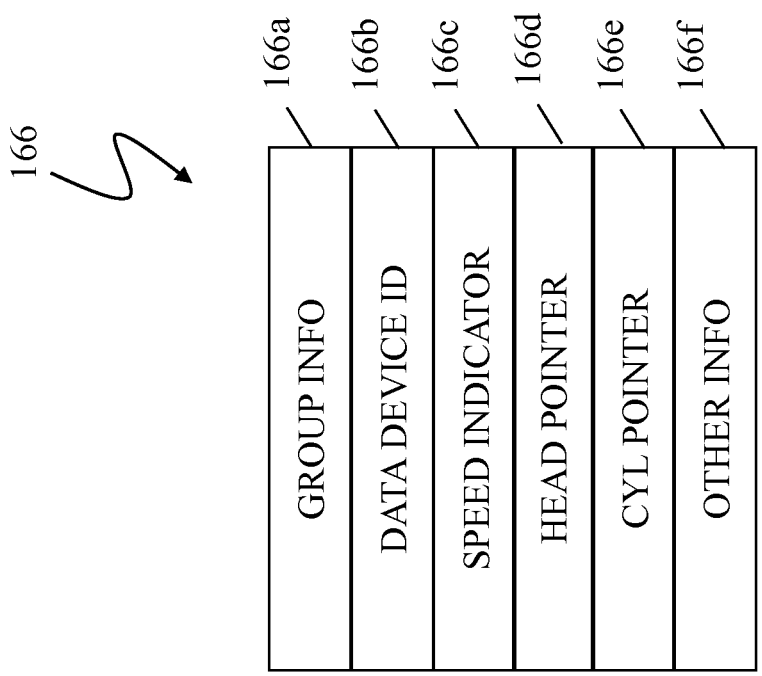
FIG. 5D is a schematic diagram showing a group element of a thin device table in connection with an embodiment of the system described herein.

As shown in FIG. 5D, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). As described in more detail elsewhere herein, a thin device may be virtually provisioned in terms of its allocated physical storage in physical storage for a thin device presented to a host as having a particular capacity is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated.

Referring to FIG. 5C, shown is a diagram 150 illustrating tables that are used to keep track of device information. A first table 152 corresponds to all of the devices used by a data storage system or by an element of a data storage system, such as an HA 21 and/or a DA 23. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Referring to FIG. 5D, shown is a schematic diagram illustrating a group element 166 of the thin device table 162 in connection with an embodiment of the system described herein. The group element 166 may include a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

As discussed elsewhere herein, the data devices 61-67 (and other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The devices 61-67 may appear to a host coupled to the storage device 24 as a logical volume (logical device) containing a contiguous block of data storage, as discussed herein. Accordingly, each of the devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be any size including file system or database logical block size, physical block, track or cylinder and/or other size. Multiple data blocks may be substantially the same size or different sizes, such different size data blocks for different storage volumes or different sized data blocks within a single storage volume.

In accordance with techniques herein, an embodiment may allow for locating all of the data of a single logical portion or entity in a same tier or in multiple different tiers depending on the logical data portion or entity. In an embodiment including thin devices, the techniques herein may be used where different portions of data of a single thin device may be located in different storage tiers. An embodiment in accordance with techniques herein may have flexibility in that a first portion of data of the thin device may be located in a different storage tier than a second data portion. For example, the first portion may be located in a tier comprising flash devices and the second portion may be located in a different tier of FC or SATA drives.

Figure 6:
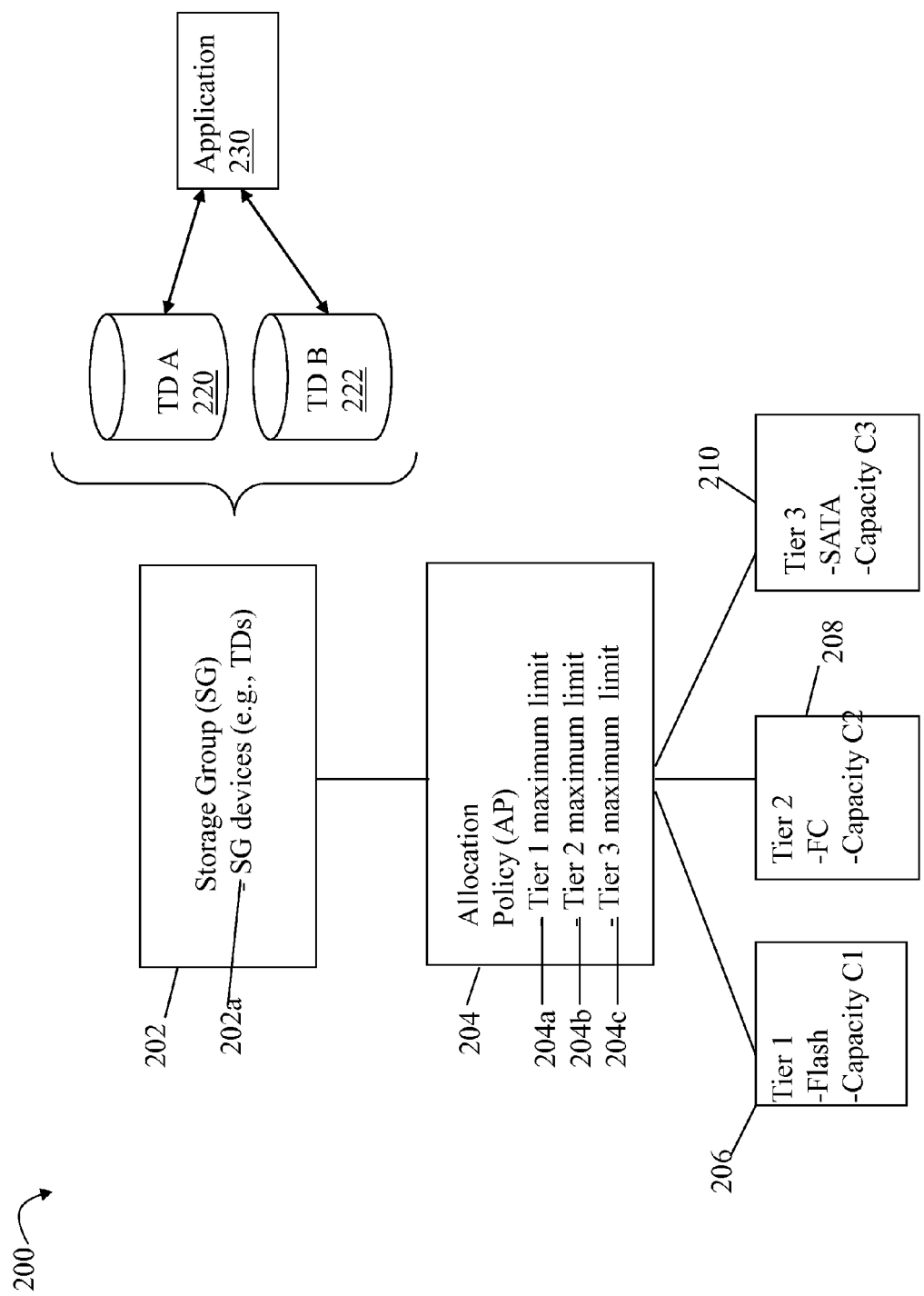
FIGS. 6 and 7 are examples illustrating a storage group, allocation policy and associated storage tiers in an embodiment in accordance with techniques herein.

Referring to FIG. 6, shown is an example illustrating information that may be defined and used in connection with techniques herein. The example 200 includes multiple storage tiers 206, 208, and 210, an allocation policy (AP) 204, and storage group (SG) 202. The SG 202 may include one or more thin devices (TDs), such as TD A 220 and TD B 222, used by an application 230. The application 230 may execute, for example, on one of the hosts of FIG. 1. The techniques herein may be used to determine how to partition physical storage of the multiple storage tiers 206, 208 and 210 for use in storing or locating the application's data, such as data of the TDs 220 and 222. It should be noted that the particular number of tiers, TDs, and the like, should not be construed as a limitation. An SG may represent a logical grouping of TDs used by a single application although an SG may correspond to other logical groupings for different purposes. An SG may, for example, correspond to TDs used by multiple applications.

Each of 206, 208 and 210 may correspond to a tier definition as described elsewhere herein. Element 206 represents a first storage tier of flash drives having a tier capacity limit C1. Element 208 represents a first storage tier of FC drives having a tier capacity limit C2. Element 210 represents a first storage tier of SATA drives having a tier capacity limit C3. Each of C1, C2 and C3 may represent an available or maximum amount of storage capacity in the storage tier that may be physical available in the system. The AP 204 may be associated with one of more SGs such as SG 202. The AP 204 specifies, for an associated SG 202, a capacity upper limit or maximum threshold for one or more storage tiers. Each such limit may identify an upper bound regarding an amount of storage that may be allocated for use by the associated SG. The AP 204 may be associated with one or more of the storage tiers 206, 208 and 210 that may be defined in a multi-tier storage environment. The AP 204 in this example 200 includes limit 204a identifying a maximum or upper limit of storage for tier1, limit 204b identifying a maximum or upper limit of storage for tier2, and limit 204c identifying a maximum or upper limit of storage for tier3. The SG 202 may be based on an SG definition identifying 202a the logical devices, such as TDs included in the SG.

In connection with techniques herein, the maximum limits 204a, 204b and 204c each represent an upper bound of a storage capacity to which an associated SG is subjected to. The techniques herein may be used to partition less than the amount or capacity represented by such limits. An amount of physical storage of a tier allocated for use by an application is allowed to vary up to the tier limit as defined in the AP 204 in accordance with other criteria associated with the application such as, for example, varying application workload. The optimizer may vary the amount of storage in each tier used by an SG 202, and thus an application, based on workload and possibly other criteria when performing a cost benefit analysis, where such amounts are subject to the limits of the SG's AP. At a second point in time, the workloads and possibly other criteria for the applications may change and the optimizer may repartition the storage capacity used by each application subject to the capacity limits of APs and performance limits.

Figure 7:
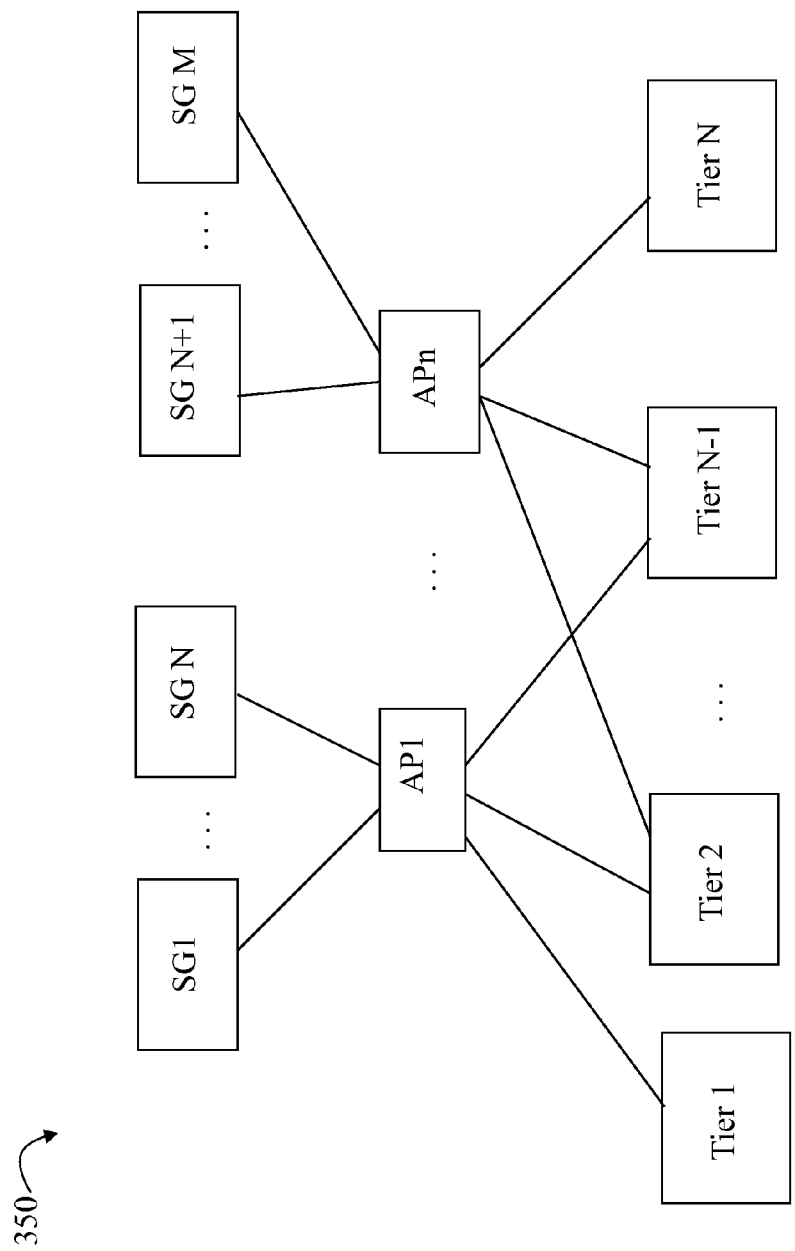

Referring to FIG. 7, shown is an example which more generally illustrates different associations between SGs, APs and tiers in an embodiment in accordance with techniques herein. The example 350 illustrates that an embodiment may have multiple storage tiers (e.g., tiers 1-N), multiple APs (e.g, AP1-N), and multiple SGs (e.g., SG 1-M). Each AP may be associated with one or more of the storage tiers. Each AP may also be associated with different tiers than other APs. For example, APn is associated with Tier N but AP1 is not. For each tier associated with an AP, the AP may define a maximum capacity limit as described in connection with FIG. 6. Each AP may be associated with one or more SGs. For example SGs1-N may be associated with a same AP1, and SGs N+1 through M may be associated with a same APn.

With reference back to FIG. 6, each of the maximum capacity limits may have any one of a variety of different forms. For example, such limits may be expressed as a percentage or portion of tier total storage capacity (e.g., such as a percentage of C1, C2, or C3), as an integer indicating an amount or quantity of storage 410c (e.g., indicating a number of bytes or other number of storage units), as a percentage with respect to the associated SG of all storage used by the SG (e.g., EFD=10%, FC=90% for an SG meaning that no more than 10% of the SG's storage consumed should be from the EFD tier), and the like.

Data used in connection with techniques herein, such as the performance data of FIG. 3 used in determining device and SG or application workloads, may be obtained through observation and monitoring actual performance. Data may also be determined in other suitable ways such as, for example, through simulation, estimation, and the like. Observed or collected data may be obtained as described in connection with FIG. 3 by monitoring and recording one or more aspects of I/O activity for each TD, and portions thereof. For example, for each TD, and/or portions thereof, an average number of reads occurring within a given time period may be determined, an average number of writes occurring within a given time period may be determined, an average number of read misses occurring within a given time period may be determined, and the like. It should be noted that the operations of read and write with respect to a TD may be viewed as read and write requests or commands from the DA, controller or other backend physical device interface. Thus, these are operations may also be characterized as an average number of operations with respect to the physical storage device (e.g., average number of physical device reads, writes, and the like, based on physical device accesses). This is in contrast to observing or counting a number of particular types of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

It should be noted that movement of data between tiers from a source tier to a target tier may include determining free or unused storage device locations within the target tier. In the event there is an insufficient amount of free of unused storage in the target tier, processing may also include displacing or relocating other data currently stored on a physical device of the target tier.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

As described herein, a thin device (also referred to as a virtually provision device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device may be constructed of chunks having a size that may vary with embodiment. For example, in one embodiment, a chunk may correspond to a group of 12 tracks (e.g., 12 tracks*64 Kbytes/track=768 Kbytes/chunk). As also noted with a thin device, the different chunks may reside on different data devices in one or more storage tiers. In one embodiment, as will be described below, a storage tier may consist of, one or more storage pools. Each storage pool may include multiple LVs and their associated physical devices. With thin devices, a system in accordance with techniques herein has flexibility to relocate individual chunks as desired to different devices in the same as well as different pools or storage tiers. For example, a system may relocate a chunk from a flash storage pool to a SATA storage pool. In one embodiment using techniques herein, a thin device can be bound to a particular storage pool of a storage tier at a point in time so that any chunks requiring allocation of additional storage, such as may occur when writing data to the thin device, result in allocating storage from this storage pool. Such binding may change over time for a thin device.

In connection with examples in following paragraphs, details such as having a single storage pool in each storage tier, a single storage group, and the like, are provided for purposes of illustration. Those of ordinary skill in the art will readily appreciate the more general applicability of techniques herein in other embodiments such as, for example, having a storage group include a plurality of storage pools, and the like.

Figure 8A:
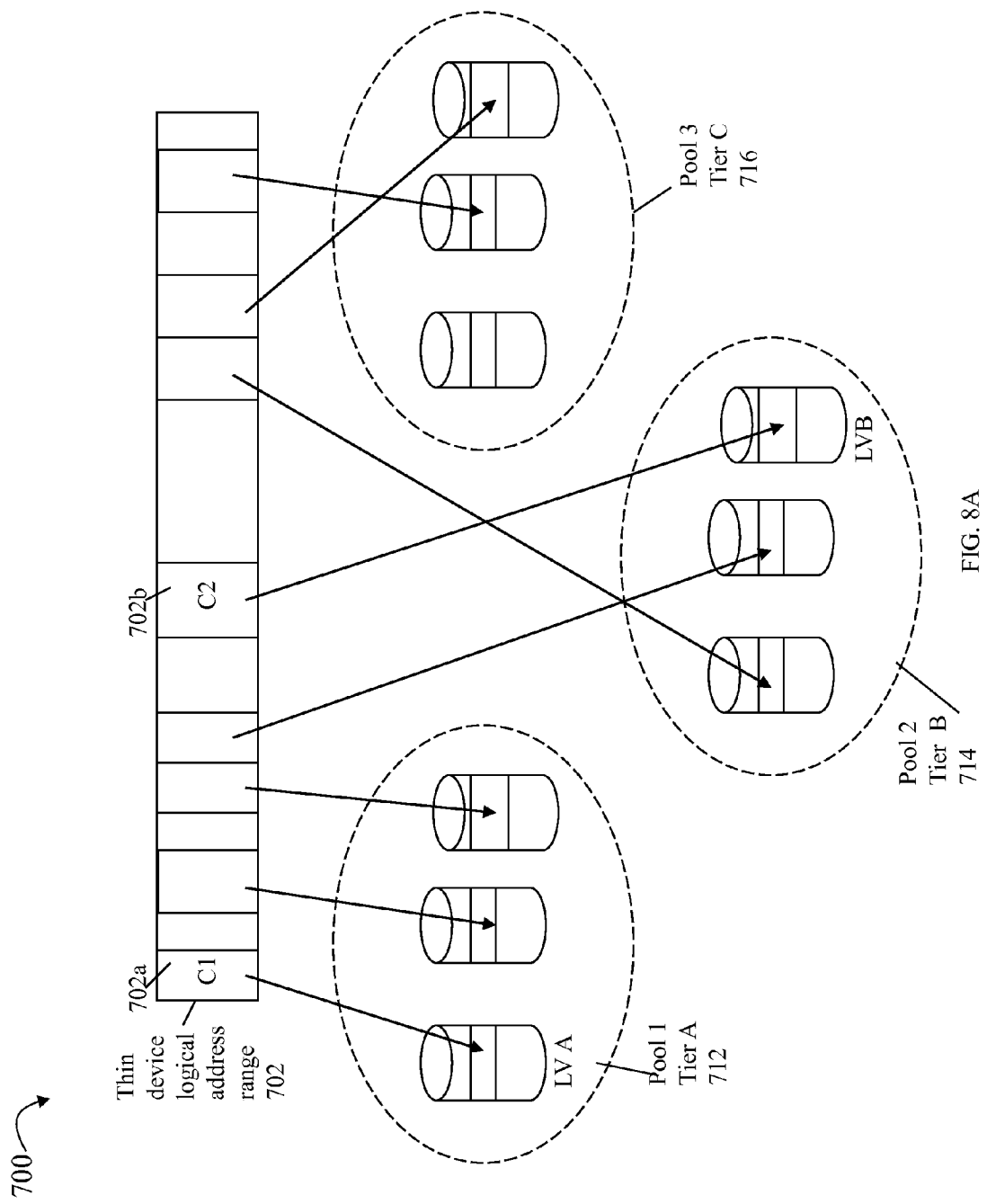
FIGS. 8A and 8B are examples illustrating thin devices and associated structures that may be used in an embodiment in accordance with techniques herein.

Referring to FIG. 8A, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of FC storage devices, and pool 716 may represent a storage pool of tier C of SATA storage devices. Each storage pool may include a plurality of logical devices and associated physical devices (or portions thereof) to which the logical devices are mapped. Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Figure 8B:
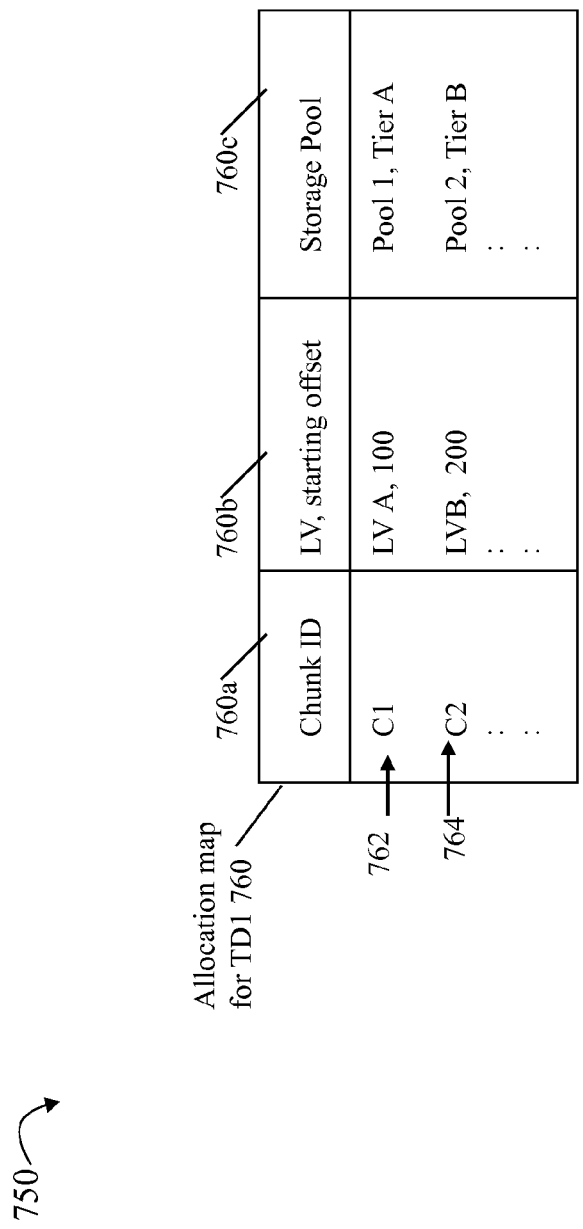

Referring to FIG. 8B, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 8A such as in connection the mapping of 702 to different storage pool devices. The allocation map 760 may contain an entry for each chunk and identify which LV and associated physical storage is mapped to the chunk. For each entry or row of the map 760 corresponding to a chunk, a first column 760a, Chunk ID, denotes an identifier to uniquely identify the chunk of the TD, a second column 760b, indicates information about the LV and offset to which the chunk is mapped, and a third column storage pool 760e denotes the storage pool and tier including the LV of 760b. For example, entry 762 represents chunk C1 illustrated in FIG. 8A as 702a and entry 764 represents chunk C2 illustrated in FIG. 8A as 702b. It should be noted that although not illustrated, the allocation map may include or otherwise use other tables and structures which identify a further mapping for each LV such as which physical device locations map to which LVs. This further mapping for each LV is described and illustrated elsewhere herein such as, for example, with reference back to FIG. 5B. Such information as illustrated and described in connection with FIG. 8B may be maintained for each thin device in an embodiment in accordance with techniques herein.

A thin or virtually provisioned device may include many small units of storage such as chunks whereby each chunk may be the smallest level of granularity associated with allocation and deallocation of storage for a thin device. A grouping of "N" chunks may be referred to as an extent, where N represents an integer number of chunks, N>0. N may be, for example, 480 in one embodiment. Each extent may represent a consecutive range or portion of the thin device in terms of thin device locations (e.g., portion of the address space or range of the thin device). Note that the foregoing use of consecutive does not refer to physical storage locations on physical drives but rather refers to consecutive addresses with respect to a range of addresses of the thin device which are then mapped to physical device locations which may or may not be consecutive, may be on the same or different physical drives, and the like. For example, in one embodiment, an extent may be 480 chunks (N=480) having a size of 360 MBs (megabytes).

An extent may be further divided into sub extents, where each sub extent is a collection of M chunks. M may be, for example 10 in one embodiment. In one embodiment, the sub-extent size may correspond to the smallest granularity of data movement. In other words, the sub extent size represents the atomic unit or minimum amount of data that can be operated upon when performing a data movement such as between storage tiers.

Figure 9:
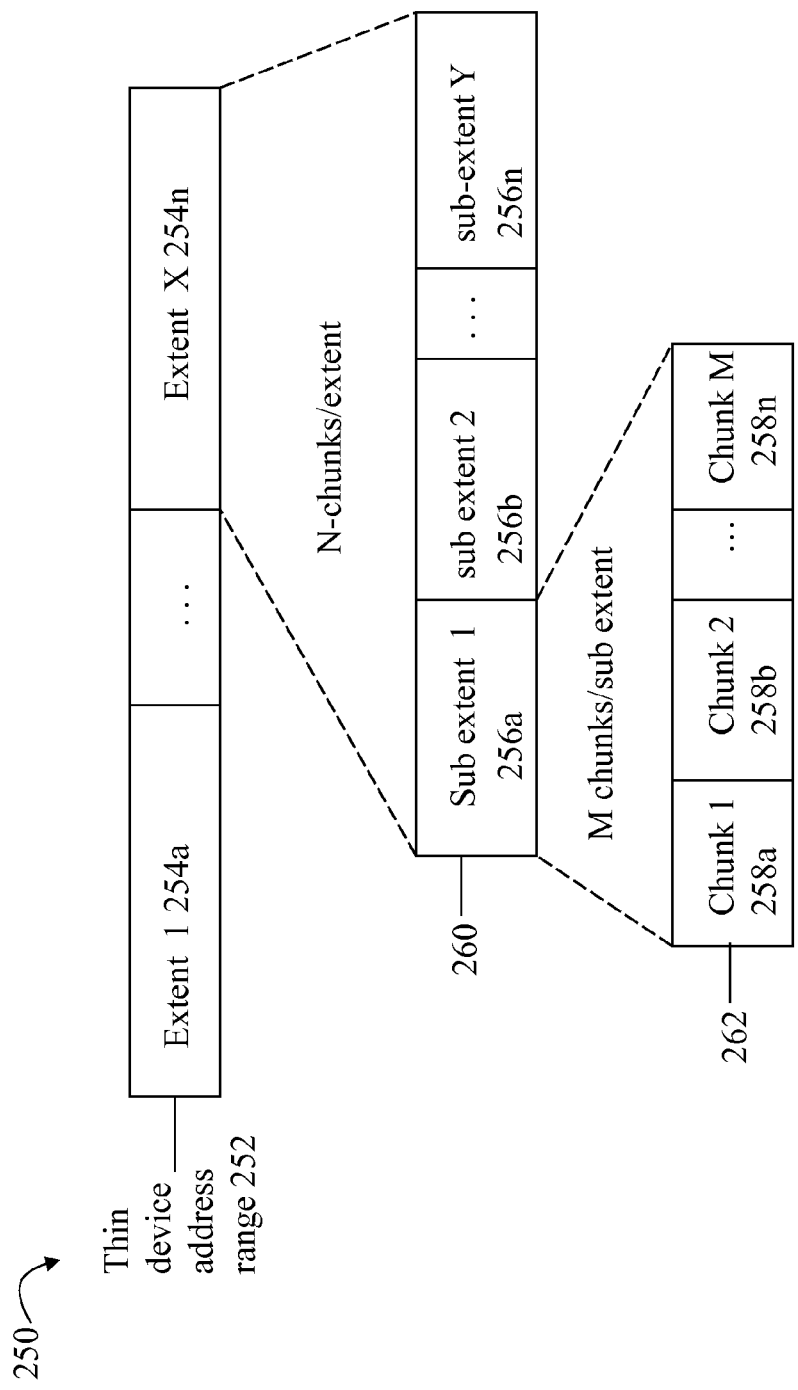
FIG. 9 is an example illustrating data portions comprising a thin device's logical address range.

Referring to FIG. 9, shown is an example illustrating partitioning of a thin device's address space or range in an embodiment in accordance with techniques herein. The example 250 includes a thin device address space or range 252 which, as described elsewhere herein, includes chunks mapped to physical storage locations. The thin device address space or range 252 may be partitioned into one or more extents 254a-254n. Each of the extents 254a-254n may be further partitioned into sub-extents. Element 260 illustrates that extent X 254n may include sub extents 256a-256n. Although only detail is illustrated for extent 254n, each of the other extents of the thin device also include a same number of sub extents as illustrated for 254n. Each of the sub extents 256a-256n may represent a grouping of "M" chunks. Element 262 illustrates that sub extent 1 256a may include chunks 258a-258n. Although only detail is illustrated for sub extent 256a, each of the other sub extents 256b-256n also include a same number of "M" chunks as illustrated for 256a. Thus, each of the extents 254a-254n may represent an grouping of "N" chunks, where $$N = \#\text{sub extents/extent} * M \text{ chunks/sub extent} \quad \text{EQUATION 1}$$

An embodiment in accordance with techniques herein may collect statistics for each extent and also other information characterizing activity of each sub extent of a thin device. Statistics for each extent, or more generally a data portion, may include, for example, average, long term and/or short term statistics which are measurements regarding the activity level of an associated data portion. Such statistics may reflect performance, workload, and/or I/O activity of the associated data portion. Examples of data collected for data portions may relate to read activity and write activity such as a random read miss rate (e.g., number of read misses/unit of time, where a read miss refers to a cache miss for a read), a write I/O rate (e.g., number of writes/unit of time) and a prefetch or sequential read rate (e.g., number of prefetches/unit of time). As known in the art, data may be prefetched from a physical device and placed in cache prior to reference or use with an I/O operation. For example, an embodiment may perform sequential stream I/O recognition processing to determine when consecutive portions of a thin device are being referenced. In this case, data of the sequential stream may be prefetched from the physical device and placed in cache prior to usage in connection with a subsequent I/O operation. In connection with a portion of data at a first point in a sequential stream associated with a current I/O operation, data subsequent to the first point may be prefetched such as when obtaining the portion from a physical device in anticipation of future usage with subsequent I/Os. The prefetch or sequential read rate may also be referred to as denoting a number of sequential reads or sequential read miss operations performed since such prefetching may occur in response to determination that a read operation is performed for data which is not in cache (read miss) and the read operation is for data included in a series of sequentially read data portions as described above.

In addition to the statistics and activity data described above, an embodiment may also collect and store information regarding expected I/O size information for each extent, thin device (or other logical device), physical device, and the like. Such information may be determined in any one or more suitable ways in an embodiment. For example, an embodiment may determine expected I/O sizes that represent the average size with respect each of the particular types of I/O operations for which statistics are collected.

In a multi-tiered storage system as described herein, an application having its data stored on thin devices of a storage group may be allowed to use multiple tiers of storage. The techniques herein may model response time of target storage tiers and overall response time across tiers, such as per SG or application, when evaluating different alternative hypothetical data movements. As described in more detail elsewhere herein, response time of an application may be one example of goal criteria. In connection with modeling response time, different modeled performance curves may be used.

The techniques herein consider different performance characteristic information and curves that may vary with each storage tier, type of physical device, device vendor, and the like. In particular, performance curves for the different storage tiers may be determined and used to model target tier and also overall SG performance across storage tiers. As an example, consider a workload of N I/O operations/second. The response time experienced for the same workload varies with storage tier due to the underlying capabilities of each tier's technology. As such, performance curves may be used in connection with techniques herein to model expected response times to model or simulate performing a particular data movement.

Referring to FIG. 10, shown is an example of performance characteristic information illustrated in the form of curves for different storage tiers such as may be based on different disk drive types. The example 550 illustrates general curve shapes as may be associated with a SATA drive (as represented by 552) and an FC disk drive (as represented by 554) in connection with processing rate (X-axis in terms of IOs/second) vs. response time (Y-axis). As may be seen from the illustration 550, for a same processing rate of I/Os/second, different RTs are obtained for each of a SATA drive and an FC disk drive. As such, when moving data storage tier of SATA drives to a storage tier of FC drives, differences in performance characteristics such as response times are taken into consideration in accordance with techniques herein. An embodiment may store data as represented by the curves of FIG. 10 in one or more tables having rows and columns of data point values (e.g., X and Y coordinates for a plurality of points). When stored in tabular form, interpolation, curve fitting techniques, and the like, may be used in connection with determining values of X and Y coordinates lying between two existing points stored in the table. When considering moving data between devices of different types or more generally having different device characteristics, such tables of performance characteristic information may be used to determine, for a given processing rate of I/Os per second, a modeled RT for each of the different device types. For example, consider a first storage tier of SATA drives and a second storage tier of FC disk drives. In modeling performance based on a proposed data movement, an aggregated or total processing rate for each target tier may be determined, for example, using performance data collected. For such a total processing rate on the X-axis, a corresponding modeled RT (response time) value (Y-axis) may be obtained for each storage tier using tables or curves, such as illustrated in FIG. 10. An embodiment may use appropriate performance curves for each of the different storage tiers and associated technologies of the tiers. The performance curves may be obtained for each storage tier based on observed or collected data through experimentation. The particular parameters or metrics of collected data used to obtain performance curves to model expected RT may vary with storage tier and underlying technology. For example, as described in U.S. patent application Ser. No. 12/924,361, filed Sep. 24, 2010, TECHNIQUES FOR MODELING DISK PERFORMANCE, which is incorporated by reference herein, performance curves for modeling response times for disk drives is described using total number of I/Os and I/O size. Other technologies such as flash-based drives may use other parameters in modeling to determine the appropriate performance curve. For example, one approach to modeling flash-based drives may utilize observed performance data related to total number of I/Os, I/O size, and a mixture or ratio of read operations/write operations. Additionally, data modeling for different storage drives may utilize a feedback process. At a point in time, there is a set of data representing the performance curve for a particular drive. The actual measured RT of the drive for a given workload in terms of I/Os per second, for example, may be compared to a modeled RT value determined using the performance curve for similar model parameter values. Adjustments may be made to the modeled performance curve based on differences between the measured RT and modeled RT. For a given storage tier, an embodiment may have a performance curve for writes (e.g., denoting various write rates vs. expected RTs), another performance curve for reads (e.g., denoting various read rates vs. expected RTs) and/or another performance curve for I/Os/second (e.g., denoting aggregated I/O activity rates of reads in combination with writes vs. expected RTs). Such performance curves may provide models that vary with one or more factors some of which are described herein. The foregoing as well as other aspects of data storage system optimizations such as having an externally located storage tier are described, for example, in U.S. patent application Ser. No. 13/466,775, filed May 8, 2012, PERFORMING DATA STORAGE OPTIMIZATIONS ACROSS MULTIPLE DATA STORAGE SYSTEMS, which is incorporated by reference herein.

Various metrics that may be used are described herein and also in U.S. patent application Ser. No. 12/924,396, filed Sep. 25, 2010, TECHNIQUES FOR STATISTICS COLLECTION IN CONNECTION WITH DATA STORAGE PERFORMANCE, which is incorporated by reference herein.

In connection with determining what data portions should be located in each of the different storage tiers such as for data movement optimizations, it may not be desirable to always locate the busiest or most active data portions in the highest performing storage, tier. There may be other factors or criteria (alone or in combination with the current activity of data portions) that should be evaluated when selecting a physical storage tier for a particular data portion. An embodiment in accordance with techniques herein may therefore generally consider goal criteria including the number of IOPS (IOs per second) or other measurement of how busy or active a data portion is, as well as other criteria. For example, a goal may be to optimize one or more response times (e.g., for one or more particular storage tiers, across multiple storage tiers for an application, for the data storage system which may be across multiple applications, and the like). When a storage tier is overloaded, it may exhibit an unacceptable response time or other metric related to the current workload or activity of the storage tier. Thus, techniques used in connection with determining data movements which seek to optimize goal criteria may take into account an acceptable limit or threshold with respect to an activity level of a storage tier such as related to response time so as not to overload any of the storage tiers with more activity than the particular tier can reasonably handle.

Some tiers, independent of any relative tier performance classification ranking, may be better suited for processing I/O operations having one or more particular I/O operation characteristics or types. For example, a tier may be better suited than one or more other tiers for processing read operations or write operations. A tier may also be better suited than one or more other tiers for sequential operations, such as sequential read and/or write operations. As such, techniques for determining which data portions are located in which storage tiers may also consider such aspects or characteristics of the workload for the data portions and whether such workload characteristics match desired or preferred characteristics of a storage tier.

The criteria may also consider the total number of affected I/O operations which may be adversely (or positively) impacted by performing a data movement, as well as a measure of how adverse (or positive) is such an impact.

Figure 11A:
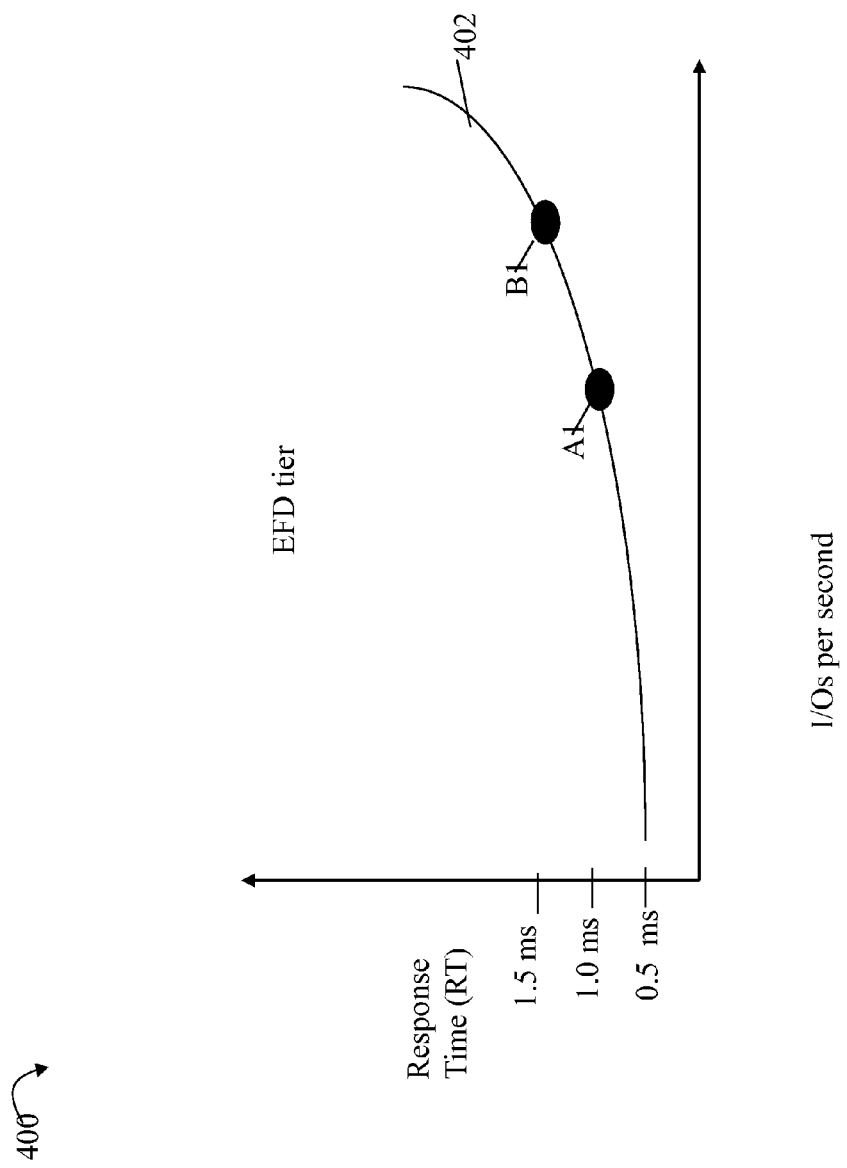
Figure 11B:
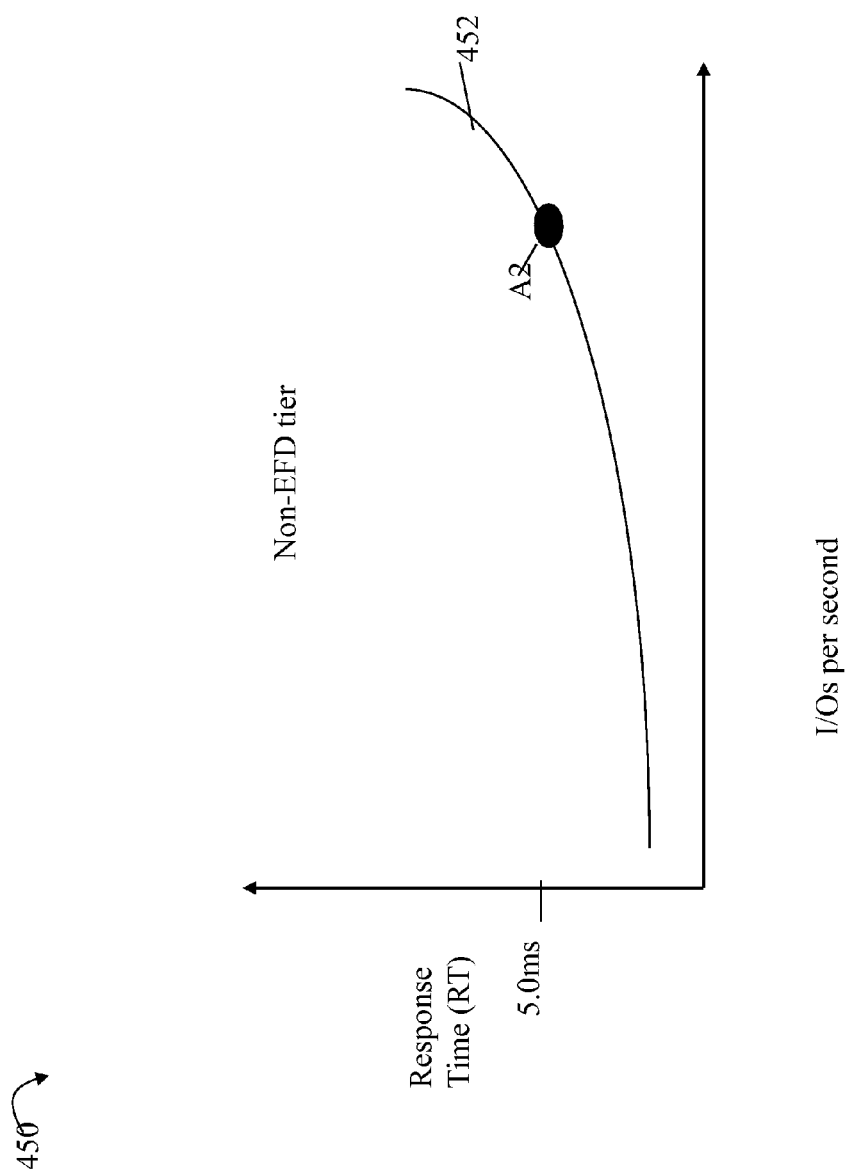

For example, referring to FIGS. 11A and 11B shown are example performance curves illustrating modeled RT for two tiers—EFD and a non-EFD tier (e.g., rotating disk drive such as SATA) based on a number of IOPs. Consider an example described as follows. Located on the curves are points denoting the current RT for each tier. Point A1 of FIG. 11A denotes the current average RT of 1 millisecond (ms) for the EFD tier and Point A2 of FIG. 11B denotes the current average RT of 5 ins for the non-EFD tier. Also, for this example, assume that 90% of all I/Os are currently in the EFD tier and obtaining a 1 ms RT and the remaining 10% of all I/O are in the non-EFD tier and obtaining the 5 ms RT. Assume there is sufficient storage capacity in the EFD tier to relocate or move the remaining 10% from the non-EFD to the EFD tier. Let point B1 denote the projected or modeled RT expected if all 100% of the I/Os or workload were located in the EFD tier thereby resulting in an average expected RT of 1.5 ms. In this case, if the foregoing data movement of 10% of the workload/IOs from the non-EFD to the LED storage tier is performed, the data portions having the 10% workload would experience a much improved RT from 5 ms to 1.5 ms. However, the cost or penalty is that data portions associated with the remaining 90% of the workload/IOs would experience an increase in RT from 1 ms to 1.5 ms. The foregoing benefit of a decrease in RT of 3.5 ms to 10% of the I/Os (e.g., small amount of the workload) relocated from the non-EFD to the EFD tier as well as the adverse impact/increase of 0.5 MS in RT affecting 90% of I/Os (e.g., large amount of the workload) currently in the LED tier may be considered in connection with criteria in deciding whether to implement a proposed data movement. Such criteria may provide for assessing, based on a set of defined goals, the overall impact to all data portions of a proposed data movement.

In connection with techniques herein, the above-mentioned performance curves may be used to provide a model of the storage tiers in the data storage system whereby the model may be used to evaluate whether to move a set of one or more data portions from tier X to tier Y and model how this proposed data movement will impact the performance of the data storage system. Such evaluation and a determination of whether to actually perform the modeled data movement may be measured with respect to achieving one or more goal criteria. For example, a goal may be based on the average RT across all tiers for the data storage system where the goal criteria indicates that such an average RT for the data storage system across all storage tiers should be less than 1.5 ms, or within some other specified target range. If the goal criteria is to maintain an average RT for the data storage system (e.g., across both storage tiers) less than the 1.5 ms threshold, then a decision may be made not to perform the proposed data movement noted above because the estimated or modeled average RT for the data storage system exceeds the threshold.

In connection with techniques herein, the foregoing aggregated average RT for the data storage system may be one example of goal criteria. More generally, techniques herein may be used with any suitable desired goal criteria. Other examples of goal criteria include an availability threshold where the goal is to maintain an availability above the threshold, maintaining a threshold amount of free or available EFD capacity (e.g., storage capacity goal related to achieving a threshold amount of available storage capacity in one or more tiers), having an average RT across all applications or the entire data storage system that is no more than a specified threshold, maintaining an average RT for a selected application, and the like. The goal criteria may include one or more of the foregoing. For example, goal criteria may include maintaining a threshold application RT and/or a threshold data storage system RT and also maintaining a threshold amount of available storage capacity in a particular tier, such as EFD, in order to be able to quickly accommodate bursts of increased workload (e.g., by moving data portions which have a burst of I/O activity to the EFD tier without having to first demote other data portions in the EFD tier is there is no available EFD capacity). Such goal criteria may be used in evaluating whether to perform a data movement (e.g., data movement may be not be further considered if it violates any goal criteria or otherwise does facilitate further movement toward attaining or maintaining goal criteria).

Following paragraphs and illustrations may utilize the particular exemplary goal criteria of average RT for the data storage system across all its storage tiers although the techniques are more generally applicable for use with any suitable goal criteria. Techniques herein may be performed to evaluate and model the impact of a proposed data movement in terms of amounts of read and/or write activity to be moved from the source tier to the target tier. The evaluations may consider the impact on overall achievement of one or more goals (e.g., impact on the source and target tiers and also overall across all tiers of the data storage system and/or for a particular application). In considering a data movement to a target tier, the techniques may also consider workload characteristics (e.g., R/W mix, sequential or random) of the data portion to be moved and whether such workload characteristics of the data portion match one or more preferred characteristics of the target tier. For example, a target tier may be configured using a particular RAID configuration or level, may include physical storage devices of a particular technology, and the like, more suitable for a particular I/O type, such as reads over writes, sequential reads, and the like. Based, on such aspects of the tier, preferred workload characteristics may be specified for the tier denoting that, for example, sequential reads should be preferably located to this tier over other types of workload.

In one embodiment, the goal may be to achieve the best possible data storage system overall RT by moving data between the various tiers. A list of recommended data movements to specific tiers may be generated as an output. Each data movement may be ranked relative to the others in the list so that such data movements may be prioritized such as when used by the data storage optimizer. In one embodiment, a data movement in the list may have an associated value, such as denoting a modeled RT improvement or other measurement of benefit for this particular data movement, that may be used by the optimizer or other consumer of the list to prioritize the data movements. Generally, the value associated with a recommended data movement may consider the benefit toward achieving the goal criteria (such as overall data storage system RT improvement) and may also consider the cost of performing the recommended data movement. The values may be used to compare and prioritize a list of recommended data movements relative to each other.

As noted above, one observation considered is that an embodiment may not want to necessarily move the most active or busiest data portions from a low performance tier to a higher performance tier. Additionally, it may not also be clear which tiers are higher or lower others in terms of relative performance ranking. The goal criteria may include optimizing the overall data storage system RT for one or more applications and, when evaluating proposed data movements, modeling may consider whether any of the tiers are overloaded or have an unacceptably high RT. The goal criteria may include, alone or in combination with the overall data storage system RT, optimizing the RT of one or more selected applications.

As described in more detail below, one or more gradients may be calculated for each tier. An embodiment may calculate one or more global gradients as described in following paragraphs. A global gradient may be a measurement of how the overall RT of the data storage system under consideration will be affected by adding (or removing) a certain, relatively small, amount of activity load (e.g., read and/or write) to each tier. Based on the global gradients, a determination may be made as to which one or more tiers should donate load (donor) and which one or more tiers should receive load (receiver). The slope of the global gradients along with the total activity level in the system may be used in determining an amount of data to be moved. For example, when the global gradients for the different tiers are significantly different and system load is light, it may be desirable to move larger amounts of data between the tiers than when, for example, the global gradients for the different tiers are relatively the same (e.g., within some minimum difference). When all the global gradients are the same (or approximately so), moving load between the tiers may have only small value or overall benefit. Additionally, a donor tier may be designated as a donor of one or more types of activity (e.g., donor of reads and/or writes). Similarly, a receiving tier may be designated as a receiver of one or more types of activity. Designating a particular tier as a donor or receiver of a particular type of activity provides for identifying the tier's role in connection with achieving the goal criteria. Once a decision has been made regarding which one or more tiers are donors and which one or more tiers are receivers, processing may be performed to sort data portions in each tier by expected activity level. Such expected activity level may be based on collected statistics as described elsewhere herein. For the donor tiers, at least some of the data portions in the tier may be sorted in descending order of activity level. For the receiving tiers, at least some of the data portions in the tier may be sorted in increasing order of activity level, it should be noted that not all the data portions currently stored in each tier need to be included in the sorting process to rank based on activity level. Rather the number of data portions selected may be generally sufficient to satisfy a threshold specified amount of data to be moved. Using the ranked and sorted lists of data portions, processing may be performed to determine a first data portion from a donor tier to be swapped with a second data portion from a receiving tier (e.g., the first data portion is moved from the donor tier to the receiving tier and the second data portion is moved from the receiving tier to the donor tier). It should be noted that if one or more tiers have available capacity and are not currently storing any data portion, the first data portion may be moved to such available or free storage without swapping any data (e.g., only the first data portion is moved to the free storage in the receiving tier). In this manner, the available storage in the receiving tier may be treated as a data portion of zero length/size having zero I/O activity or workload.

Processing of the techniques herein may be performed with respect to the entire data storage system, for a selected application or SG, a specified set of LUNs, and the like, upon the occurrence of a predetermined time period depending on the particular goal criteria. For example, one embodiment may perform the techniques herein for determining data movements every 10 minutes with goal criteria that seeks to optimize or minimize the overall data storage system RT. As noted above, a set of one or more global gradients may be calculated for each tier. Each gradient for a tier may be a measurement of an activity movement or change (e.g., adding an amount of activity to the tier or removing an amount of activity from the tier) and the impact of such activity change on the RT of the storage tier, and also the impact on average data storage system RT across all storage tiers (e.g., the goal criteria impact). A local gradient with respect to a tier may be defined as a measurement of an activity movement or change (e.g., adding an amount of activity to the tier or removing an amount of activity from the tier) and the impact of such activity change on the RT of the storage tier. A global gradient with respect to a storage tier may be measurement of an activity movement or change (e.g., adding an amount of activity to the tier or removing an amount of activity from the tier) and the overall impact of such activity change on the RT of the data storage system. In one aspect, a local gradient may generally be used to model what will happen to the tier (in terms of RT or other goal criteria) if there is a specified amount of activity load added to/removed from the tier. The specified amount or unit may be a relatively small amount with respect to the current workload or activity. Similarly, a global gradient may generally be used to model what will happen to the data storage system (in terms of RT or other goal criteria) if there is a specified amount of activity load added to/removed from one of the tiers. The specified amount or unit of activity change may be a relatively small amount with respect to the current workload or activity.

For example, if a tier has a current rate of 50,000 IOPs, the increment/decrement of change in the read and write rate may be, for example 1,000 writes/second or reads/second, or some other suitable rate which may be less than this.

For each tier, an assessment may be made regarding the potential impact on the tier RT and the overall data storage system RT (e.g., across all tiers as an aggregate) in response to moving a small amount of workload to or from the tier. For each tier, it may be determined what is the delta (e.g. Δ) or change in RT for the tier and also the data storage system for adding and removing read activity and/or write activity. In this manner, an embodiment in accordance with techniques herein may determine and use a set of one or more global gradients for each tier. Described in following paragraphs are techniques that may be used to calculate four gradients for each tier. However, more generally, it should be noted that an embodiment may also calculate and use any one or more such global gradients for each tier.

In one embodiment, a set of four global gradients may be determined for each tier based on 4 different combinations for activity type (e.g., read and write) and movement (e.g., adding workload to the tier or removing workload from the tier). In one embodiment, the activity change may be expressed in terms of an increase or decrease in data operations performed per unit of time, such as a read rate (e.g. number of reads/second) and a write rate (e.g., number of writes/second). For each specified, amount of activity change, an expected change in tier RT may be determined and an expected change in data storage system RT may be determined. The foregoing expected changes may be expressed in terms of increases or decreases in RT with respect to current RT values for the tier and data storage system. The expected change to tier RT may be modeled, for example using performance curves, such as read and write performance curves, as described herein. For example, with reference to FIG. 11A, assume FIG. 11A represents a performance curve for write IOps (write operations/second) vs. RT. If the activity change is an increase in activity workload from A1 to B1, the change in activity may be represented as the difference between the X coordinates of A1 and B1. The change in tier RT may be represented as the difference between the Y coordinates of A1 and B1.

Figure 12:
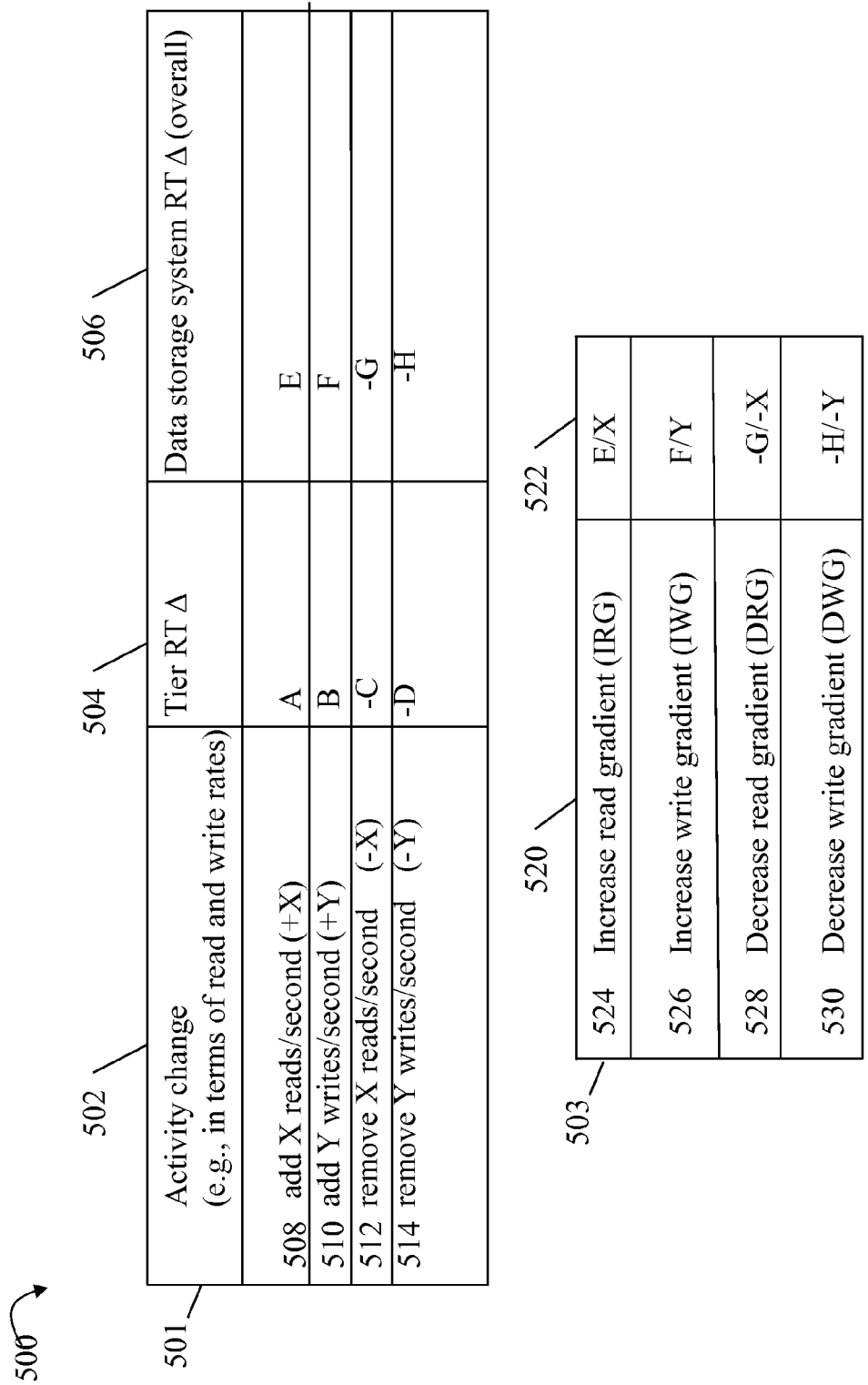
FIG. 12 is an example illustrating tables of information that may be used in connection with techniques herein.

Referring to FIG. 12, shown is an example 500 illustrating tables of information that may be used in connection with techniques herein. Table 501 may include the information used to determine the gradients included in table 503 for each tier. In other words, an instance of the information in each of the tables 501 and 503 may be determined for each tier to assess the impact on the overall data storage system RT if a certain change in workload occurs for that tier. Column 502 denotes the amount of activity change in terms of read and write rates. Column 504 denotes the change (Δ) in tier RT due to an activity change. Column 506 denotes the change (Δ) in data storage system RT due to an activity change. Row 508 identifies that adding X reads/second (e.g. +X) to the tier causes a change in tier RT, A, and a change in data storage system RT, F. Row 510 identifies that adding Y writes/second (e.g., +Y) to the tier causes a change in tier RT, B, and a change in data storage system RT, F. Row 512 identifies that removing X reads/second (e.g., −X) from the tier causes a change in tier RT, C, and a change in data storage system RT, G. Row 514 identifies that removing Y writes/second (e.g., −Y) from the tier causes a change in tier RT, D, and a change in data storage system RT, H. It should be noted that the quantities A-H are also signed depending on the particular modeled RT change (e.g., will be + if the corresponding activity change in the same row causes the RT to increase and will be − if the corresponding activity change in the same row causes the RT to decrease). For purposes of this example, assume that quantities A, B, E and F are positive, and C, D, G and H are negative.

Estimated or modeled values for 504 may be determined using performance curves based on a relative change (e.g. increase or decrease) in RT from a current RT. An expected or modeled data storage system RT (e.g., values in column 506) may be determined based on the resulting modeled tier RT (in which there has been a modeled change in activity) in combination with current RTs for the other tiers. The modeled data storage system RT may be determined, for example, as a weighted RT average across the tiers or other suitable technique. The data storage system or overall RT may take into account the RT of each tier and the amount of data and activity (workload) on each tier. For example, the data storage system RT may weight RTs for each tier based on the relative percentages accounting for an amount of workload or activity and amount of data in each tier.

A gradient (local or global) may generally be expressed as a change or impact on the RT given an activity change. More formally, the gradient may be represented as:

$$\frac{\Delta \text{ or Change in } RT}{\Delta \text{ or Change in Activity}} \qquad \text{EQUATION 2}$$

It should be noted that both the Δ's or changes for RT and activity are signed quantities—"+" if there is an increase and "−" if there is a decrease. The gradient may represent a slope or change in RT with respect to a specified amount of change in activity. As will be appreciated by those of ordinary skill in the art, a gradient determined using EQUATION 2 may be positive if the numerator and denominator are either both positive or both negative. Otherwise, the gradient represents a negative quantity. The Δ in RT may be the resulting increase or decrease in RT with respect to the current RT (e.g., difference between expected RT with revised workload and current RT). Similarly, Δ in activity may the resulting increase or decrease in activity with respect to the current activity or workload (e.g., difference between new or revised activity level and current activity level). In connection with techniques herein, one or more global gradients may be determined with respect to overall impact or change in data storage system RT.

Based on EQUATION 2, an embodiment may determine a set of four global gradients for each of the storage tiers as in table 503 where a gradient is determined for each of the four types of activity change noted above. Table 503 includes column 520 denoting the particular type of global gradient for a tier and column 522 denotes how the global gradient is calculated using the variables in table 501. The four global gradients for each tier may be the increase read gradient (IRG) denoting the global gradient when the read workload or activity is increased, the increase write gradient (IWG) denoting the global gradient when the write workload or activity is increased, the decrease read gradient (DRG) denoting the global gradient when the read workload or activity is decreased, and the decrease write gradient (DWG) denoting the global gradient when the write workload or activity is decreased. Line 524 identifies that the IRG may be calculated as E/X (values from line 508 of table 501). Line 526 identifies that the IWG may be calculated as F/Y (values from line 510 of table 501). Line 528 identifies that the DRG may be calculated as −G/−X (values from line 512 of table 501). Line 530 identifies that the DWG may be calculated as −H/−Y (values from line 514 of table 501).

It should be further noted that an embodiment may determine global gradients for the storage tiers which represent a change in activity collectively for both read and write activity (for a particular R/W mixture) with respect to the net impact in data storage system RT for this aggregated read and write activity. To further illustrate, two global gradients may be determined for each tier. A first collective or aggregated activity global gradient may be AG (add activity gradient) which is the global gradient determined when adding both read and write activity to the tier. Using the variables A-H as included in table 501 of FIG. 12, AG may be expressed as (E+F)/(X+Y). A second collective or aggregated activity global gradient may be RG (remove activity gradient) which is the global gradient determined when removing both read and write activity from the tier. Using the variables A-H as included in table 501 of FIG. 12, RG may be expressed as (−G+−H)/(−X+−Y).

Generally, EQUATION 2 may represent the slope or gradient of a modeled performance curve describing its steepness, incline, or grade. A higher slope value indicates a steeper incline. A first point on the performance curve may correspond to the current workload or activity (X coordinate) and associated tier RT (Y coordinate). A second point on the performance curve may correspond to the new or updated workload based on the activity change and its associated RT. Slope is normally described by the ratio of the "rise" divided by the "run" between two points on a line. The rise between two points is the difference between the y coordinates at those two points, such as $y_1$ and $y_2$ whereby the rise is $(y_2-y_1)=\Delta y$. The run may be expressed as the difference between the x coordinates at these two points, such as x1 and x2 whereby the run is $(x_2-x_1)=\Delta x$. Thus, each of the gradients may be represented as a ratio of a change in Y coordinates over a change in X coordinates as in EQUATION 2.

At least one global gradient for one of the tiers should be positive or at least non-negative. If a global gradient is positive, it means that the associated activity change causes an increase in the data storage system or overall RT goal.

Once the gradients for each tier have been calculated, processing continues with identifying one or more donor tiers and one or more receiving tiers based on the sets of one or more global gradients for the storage tiers. The selection of donor and receiving tiers may be based on a relative ranking or ordering of the gradients of the different tiers. In an embodiment calculating DRG and DWG global gradients for, each tier, the gradients DRG, DWG of each tier related to removing or decreasing activity (e.g., being donated out of or removed from the tier) may be used in determining one or more donor tiers. In a similar manner, in an embodiment calculating IRG and IWG global gradients for each tier, the gradients IRG, IWG of each tier related to adding or increasing activity may be used in determining one or more receiving tiers.

To further illustrate, the DRGs for each tier may be sorted in decreasing order to determine one, or more donor tiers that are donors of reads. For the ranked list of DRGs, the tier having the largest non-negative DRG (e.g., steepest slope) may be the donor of reads tier from which read activity will be removed. If more than one donor read tier is desired, multiple tiers may be selected having the highest non-negative DRG values. The DWGs for each tier may be sorted in decreasing order to determine one or more donor tiers that are donors of writes. For the ranked list of DWGs, the tier (or tiers) having the largest non-negative DWG may be the donor of writes tier from which write activity will be removed. If more than one donor write tier is desired, multiple tiers may be selected having the highest such non-negative DWG values. A tier designated as a donor of writes having the largest DWG value may donate a write workload expected to result in obtaining better improvements with respect, to a goal, such as improved data storage system RT, than if the same write workload was donated from one or more other tiers. A tier designated as a donor of reads having the largest DRG value may donate a read work load expected to result in obtaining better improvements with respect to a goal, such as improved data storage system RT, than if the same read workload was donated from one or more other tiers.

The IRGs for each tier may be sorted in increasing order to determine one or more receiving tiers that are receivers of reads. For the ranked list of IRGs, the tier having the smallest non-negative IRG may be the receiving tier of reads to which read activity will be added. If more than one receiving read tier is desired, multiple tiers may be selected having the lowest non-negative IRG values. The IWGs for each tier may be sorted in increasing order to determine one or more receiving tiers that are receivers of writes. For the ranked list of IWGs, the tier having the smallest non-negative IWG may be the receiver of writes tier. For the ranked list of IWGs, the tier having the smallest non-negative IWG may be the receiving tier of writes to which write activity will be added. If more than one receiving write tier is desired, multiple tiers may be selected having the lowest non-negative IWG values. A tier designated as a receiver of writes having the smallest IWG value which receives a write workload may be expected to have less of an adverse impact on overall data storage system RT goal criteria than if the same write workload was placed in another tier. A tier designated as a receiver of reads having the smallest IRG value which receives a read workload may be expected to have less of an adverse impact on overall data storage system RT goal criteria than if the same read workload was placed in another tier.

It should be noted that an embodiment may select more than one tier as being included in the set of receiving tiers for reads and may select more than one tier as being included in the set of receiving tiers for writes. Also, depending on the global gradient values, it may be that an embodiment does not select a tier for each of the four global gradients (e.g., if all DRG values are small, non-negative and relatively the same, no donor read may be selected).

As a variation to the foregoing, an embodiment may sort and rank the DRGs and DWGs as a single list in decreasing order and select one or more donor tiers whereby those one or more donor tiers have the highest non-negative gradients in the list. In a similar manner, an embodiment may sort and rank the IRGs and IWGs as a single list in increasing order and select one or more receiving, tiers whereby those one or more receiving tiers have the smallest non-negative gradients in the list.

As yet a further variation, an embodiment may use AG and/or RG gradients in determining donor and receiving tiers. For example, the AG values for the tiers may be sorted in descending order. The tier having the largest gradient (e.g. indicating the steepest slope) may be selected as the donor tier. The IRG and IWG values for the donor tier may be used in determining whether the tier is a donor and/or receiver of writes. The RG values for the tiers may be sorted in increasing order. One or more receiving tiers may be selected as those having the smallest RG value(s). The DRG and DWG values for the receiving tier may be used in determining whether the tier is a donor and/or receiver of reads.

As yet a further variation, an embodiment may calculate one global gradient for each storage tier. For example, an embodiment may calculate one of the four global gradients of table 503 in FIG. 12 or one of the AG and IG global gradients. If the embodiment uses DRG values, an embodiment may sort tiers based on DRG values and select the tier having the highest DRG as the donor of reads and the tier having the lowest DRG as the receiver of reads. If an embodiment uses DWG values, the tiers may be sorted based on DWG values and select the tier having the highest DWG as the donor of writes and the tier having the lowest DWG as the receiver of writes. If an embodiment uses IRG values, the tiers may be sorted based on IRG values and select the tier having the smallest IRG value as the receiver of reads and the tier having the highest IWG as the donor of reads. If an embodiment uses IWG values, the tiers may be sorted based on IWG values and select the tier having the smallest IWG value as the receiver of writes and the tier having the highest IWG as the donor of writes.

It should be noted that a tier may be both a donor and a receiver depending on the particular embodiment and the tier. For example, a tier may be both a receiving tier for reads and a donor tier for writes, and vice-versa (e.g. a tier may be both a receiving tier for writes and a donor tier for reads). A tier may be a receiver for both reads and writes. A tier may also be a donor of both reads and writes (e.g. if the tier benefits about the same from offloading any activity independent of whether such activity is read or write).

After selecting a first set of one or more donor tiers and a second set of one or more receiving tiers, activity or workload statistics (such as described elsewhere herein) for at least some data portions in the tiers may be obtained. The data portions may then be ranked based in such activity data. If a first tier is a donor tier for writes, the write activity data for at least some data portions in the first tier may be used to rank or sort the data portions in descending or decreasing write activity level. The write activity data, may include, for example, any one or more of an average write rate, average amount of data written/second, and the like. The data portions may be ranked with those having the highest write activity at the top of the list. Similarly, if a second tier is a donor tier of reads, the read activity data for at least some data portions in the second tier may be used to rank or sort the data portions in descending or decreasing read activity level. The read activity data may include, for example, any one or more of an average read rate, average amount of data read/second, and the like. The data portions may be ranked with those having the highest read activity at the top of the list.

For receiver tiers, the data portions may be ranked in increasing order of workload or activity (e.g. from lowest to highest activity level). If a first tier is a receiving tier for writes, the write activity data for at least some data portions in the first tier may be used to rank or sort the data portions in ascending or increasing write activity level. The data portions may be ranked with those having the lowest write activity at the top of the list. Similarly if a second tier is a receiving tier for reads, the read activity data for at least some data portions in the second tier may be used to rank or sort the data portions in ascending or increasing read activity level. The data portions may be ranked with those having the lowest read activity at the top of the list.

It should be noted that more generally, data portions in a tier may be ranked based on aggregated activity data representing the current workload of the data portions for both read and write activity rather than determining ranking based solely on read activity data or write activity data. The aggregated activity data may be used, for example, in embodiments where statistics may not be collected individually for each particular type (read and write). The aggregated activity data may be used, for example, where a tier, such as a donor tier, may be a designated donor of reads and writes.

The foregoing sorted or ranked lists of data portions of the different tiers may denote an ordering in which the data portions are considered for a potential data movement. Using the sorted lists of data portions for the donor and receiver tiers, a data movement candidate may be identified by selecting a first data portion from a donor tier and a second data portion from a receiving tier. Based on data movement criteria (and in accordance with goal criteria), a "best" data movement may be determined. The processing may include selecting the second data portion from one or more receiving tiers through modeling and evaluation. As described below in more detail, the data movement criteria may include looking at characteristics of the different receiving tiers. For example, if the first data portion is included in a donor write tier, processing may include ranking multiple receiving tiers whereby data portions in any receiving write tiers are evaluated prior to other receiving tiers. Similarly, if the first data portion is included in a donor read tier, processing may include ranking multiple receiving tiers whereby data portions in any receiving read tiers are evaluated prior to other receiving tiers. If there are multiple receiving read tiers, other aspects or characteristics of the different receiving read tiers may also be considered. For example, a first of the receiving read tiers may have a particular RAID configuration such as RAID-1 and a second of the receiving read tiers may have a different RAID configuration, such as RAID-5 or RAID-6. It may be desirable to consider the current workload characteristics of the first data portion in connection with selection of a receiving tier. For example, if the first data portion is primarily write operations, it may be preferable for performance reasons in connection with performing writes to select the first receiving read tier awing the RAID-1 configuration over the second receiving read tier having the RAID-6 configuration. Within the donor and receiving tiers, data portions may be sorted based on activity levels to further facilitate considering certain data portions as data movement candidates prior to others in order to promote efficiency toward attaining and maintaining goal criteria.

As an example, a first data portion of a donor write tier may be selected as the data portion having the highest write activity in the donor write tier. A second data portion may be selected from a receiver write tier. Processing may be performed to model the data movement whereby the first data portion is moved from the donor write tier to the receiving write tier and the second data portion is moved from the receiving write tier to the donor write tier. The data movement may be modeled by accordingly first modeling movement of the workload or activity of the first data portion. In this case, the modeled activity of moving the first data portion may be determined by decreasing the activity levels of the donor write tier by the amounts of any read and/or write activity of the first data portion and also increasing the activity levels of the receiving write tier by the amounts of any read and write activity of the first data portion. Similarly, modeling movement of the second data portion from the receiving write tier to the donor write tier may be determined by first decreasing activity levels of the receiving write tier by the amounts of any read and/or write activity of the second data portion and also increasing the activity levels of the donor write tier by the amounts of any read and write activity of the second data portion. The modeling of the data movements may use performance curves and the gradients, or more specifically, the information in tables 502 and 503 of FIG. 12, to determine the impact on the RT for a storage tier and also on the overall data storage system RT (e.g., impact on the goal criteria where the goal criteria may be to minimize the overall data storage system RT and/or possibly other criteria).

If the modeled data movement does not improve or result in movement toward attainment of the goal criteria, the data movement modeled may be disregarded and processing may continue to select and evaluate one or more other data portions from a receiving tier, such as the receiving write tier, as potential data movements. For a single data portion from a donor tier, multiple data movements or swaps may be modeled considering different data portions from receiving tier(s) to determine a best such data movement based on data movement criteria. The data movement criteria may specify that the modeled data movement must improve the current data storage system RT by a threshold amount, or more generally, result in meeting the goal criteria or otherwise move in a positive direction toward the goal criteria. For example, one embodiment may evaluate and model a certain number of data movements each involving the first data portion from the donor tier and a data portion from the ranked list in the receiving tier. One of the data movements may then be selected whereby the selected data movement is expected to result in reducing the data storage system RT by the largest amount of all the data movements evaluated. The data movement criteria may include selecting a second data portion from a set of data portions of the receiving tier (where the second data portion is to be swapped with the first data portion from the donor tier) whereby the selected second portion reduces the current data storage system RT by the largest amount of all data movements evaluated. More generally, the data movement criteria may also include other criteria used to select a particular receiving tier and/or a particular data portion in the receiving tier. For example, as described elsewhere herein, such data movement criteria may consider the workload characteristics of the donor and receiving tiers, workload or activity level of the first data portion, and also the workload of other data portions of the receiving tier(s) evaluated as potential second data portion "candidates" for the data movement or swap with the first data portion.

When selecting a second data portion from one or more receiving tiers as the "receiver" (to be swapped with the data portion from the donor tier), an embodiment may consider other data movement criteria besides obtaining a best or most improved data storage system modeled RT closest to the goal RT (e.g., may consider other criteria in combination with the goal criteria). Such other criteria may relate to the workload characteristics of a data portion being moved to a target tier and may include, for example, activity workload characteristics of the primary type of I/O activity for the data portion (such as read or write based on collected activity data), whether the I/O is sequential or random, and the like. For example, as described above, a first receiving tier configured using RAID-1 may be selected over a second receiving tier configured using RAID-6 for donor data portions having a high amount of write activity over a threshold level (e.g., more than 50% R/W mixture, more than an absolute amount or level of write activity specified using a write rate given a particular I/O size or average I/O size). In one embodiment, such other criteria may be used to select one of the receiving tiers. In this manner, the selected receiving tier and selected second data portion in such receiving tier may be characterized as a best selection based on the data movement criteria. It should be noted that generally, the data movement criteria may include criteria which is required and/or optional. For example, it may be required that all data movements selected meet the goal criteria. However, other criteria such as having a match between workload characteristics of the donor data portion and those preferred for the receiving tier may be optional. For example, a donor tier may be a donor of reads. A first data portion in the donor tier may have workload characteristics or activity data indicating primarily random read activity. The receiving tier may be designated as receiver of reads. Furthermore, the receiving tier may have characteristics which are typically preferred for sequential reads such as due to physical device technology. However, such a preference for sequential reads over random reads may denote an optional criteria whereby it is desirable but not required. More generally, the foregoing data movement criteria may also include matching workload characteristics of a data portion (being considered for movement to a target tier) to a preferred set of one or more characteristics of a candidate target tier.

Figure 13:
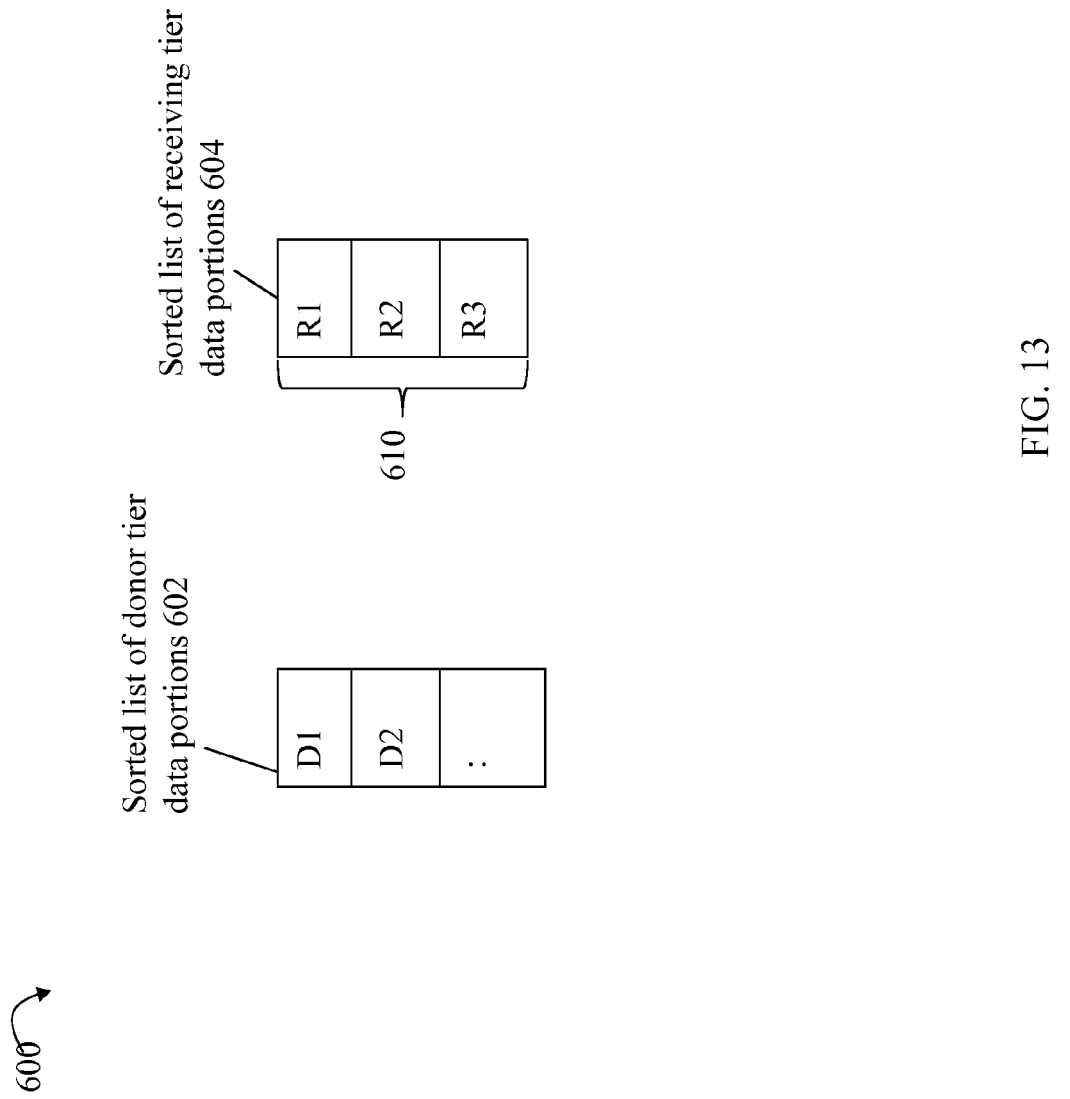
FIG. 13 is an example of sorted lists that may be used in an embodiment in accordance with techniques herein.

To further illustrate, reference is made to FIG. 13 which includes a sorted list of data portions in the donor tier 602 and a sorted list of data portions in the receiving tier 604. In this example, let the donor tier be a write donor tier (e.g., tier that wants to donate/remove write workload) and the receiving tier be a write receiving tier (e.g., tier that wants to receive write workload). The list 602 may be sorted based on decreasing write activity (descending order of write activity) and the list 604 may be sorted based on increasing write activity (ascending order of write activity). Data portions in list 602 are denoted Di where "i" denotes the position in the list 602. Data portions in list 604 are denoted Ri where "i" denotes the position in the list 604. Processing may be performed to select D1 from the list 602 (having the highest write activity of data portions in the list 602). In accordance with goal and data movement criteria, processing may be performed to select a best data movement of D1 in combination with any data portion in list 604. Furthermore, such processing may evaluate several different potential data movements and may select a best such data movement involving D1 and one of possibly many data portions in the receiving tier. In this example, processing may be performed to evaluate three data movements involving D1 and data portions 610 from the receiving tier. A first data movement involving D1 and R1 may be modeled in which the data storage system RT increases. As a result, this first data movement is not considered further. A second data movement is evaluated involving D1 and R2 whereby movement of D1 to the receiving tier and movement of the R2 to the donor tier is modeled to determine a resulting data storage system RT for the second data movement. The second data movement may result in a first resulting data storage system RT. A third data movement is evaluated involving D1 and R3 whereby movement of D1 to the receiving tier and movement of the R3 to the donor tier is modeled to determine a second resulting data storage system RT for the third data movement. In this example, assume the second resulting data storage system RT for the third data movement (D1-R3 swap) is lower than the first resulting data storage system RT for the second data movement (D1-R2 swap). In this case, the third data movement may be added to a list of recommended data movements such as may be implemented by the data storage optimizer at a later point in time. The data portions R3 and D1 may be respectively removed from the lists 602, 604 and processing may continue with the next donor data portion D2 in the ranked list 602. Processing may be performed in a similar manner to select a data portion from the list 604 for D2, and so on.

Processing using the lists 602, 604 to determine recommended data movements may be performed until any one or more termination conditions exists. For example, the processing may continue until a data movement limit has been reached. An embodiment may determine through any suitable means an amount of data to be moved between storage tiers. Once a sufficient number of recommended data movements has been determined to meet this amount of data, processing may stop. Termination criteria may also include performing processing until no further data movements meeting the goal criteria can be determined. For example, there may be no data portions remaining in the donor tier and/or receiving tier to be processed thereby causing processing to terminate. It may also be the case that any remaining data portions in the lists 602, 604 may be used in data movements determined not to have met the goal criteria. For example, modeling any such data movements may have resulted in increasing the data storage system RT thereby not being in accordance with goal criteria to perform data movements which improve data storage system RT (thus there are no remaining "good" or qualified potential data movements since any possible remaining data movements are not in accordance with goal criteria of improving the data storage system RT (e.g., modeled data storage system RT is better than current data storage system RT)).

As described elsewhere herein, a data movement may be modeled by shifting or moving the workload of the data portion from its current tier to another tier using the gradients, or more generally, the information such as included in FIG. 12.

As a further example in connection with FIG. 13, assume that the data movements D1-R2 and D1-R3 as described above result in approximately the same decrease in data storage system RT (e.g., same or similar decrease within some threshold amount). In accordance with data movement criteria, the donor tier, although a donor of writes, may also be preferred for sequential reads over other types of I/O activity. In other words, the donor tier may be a donor of writes and also a receiving tier of reads. Furthermore, the donor tier may be characterized as preferred for read workload that is sequential rather than random. R2 may have activity data indicating that R2 has primarily sequential reads and R3 may have activity data indicating that R3 has primarily random or non-sequential reads. In this case, the data movement D1-R2 may be selected as the better data movement than D1-R3 due to the type of workload of R2 matching preferred characteristics of the donor tier for sequential reads.

As described above, techniques herein may be used to determine an impact of a data movement on a goal, such as a data storage system RT goal, and/or an application RT goal for a particular SG or application (e.g., where the SG may be a set of LUNs or other logical devices including data portions for the one application). One embodiment as described herein may use goal criteria that includes overall data storage system RT such as to minimize the data storage system RT but may not include any application-specific RT goals. However, as also described herein an embodiment may select any suitable goal criteria including specifying an application-specific RT goal for one or more selected applications. The application-specific RT goal may be to maintain an application RT at or below a particular threshold. The application specific RT goal may be included in goal criteria alone, or in combination with, other criteria such as the data storage system RT goal. It may be that the same storage tiers of PDs may be used by multiple different applications (or multiple SGs) so that performing a data movement of a data portion for one application may have an impact on one or more other applications and their associated respective goals. In such an embodiment, the overall impact on each application's goal may be considered and evaluated when using techniques described herein as may be needed in accordance with relevant goal criteria. It will be appreciated by those skilled in the art that an assessment regarding effect on RT for a selected application (or selected one or more applications) may be made in a manner similar to that as described herein for modeling data storage system RTs. For example, when evaluating whether to perform a data movement, techniques herein may consider the effect on each application's average RT. For example, assume there are two applications—APP1 and APP2—each sharing the same PDs in a two-tiered storage system including an EFD tier and a SATA tier. A potential or candidate data movement being evaluated is to move a first data portion of APP1 from the EFD tier, the donor tier, to the SATA tier, the receiving tier. Assume there is currently available or unused storage in the SATA tier so that a swap of data portions is not needed. At the tune of evaluation, APP2 has all its data stored in the SATA tier and APP1 has all its data stored in the EFD tier. In this case, moving the first data portion of APP1 to the SATA tier will adversely impact the average RT of APP2. Movement of the first data portion to the SATA tier may cause the average RT for APP2 to exceed a specified threshold although the average RT for APP1 may be within its application-specific average RT threshold. Therefore, a decision may be made not to perform the data movement for goal criteria which specifies that the RT for APP1 should not exceed the above-mentioned specified threshold. As another exemplary goal with multiple applications, an embodiment may consider the average RT across all applications or the data storage system, such as the average RT for both APP1 and APP2 in the aggregate. Assuming for simplicity that the data storage system only stores data for APP1 and APP2, the goal may be to have an aggregated average RT which may represent the data storage system RT (as described above) below a specified threshold.

Figure 14:
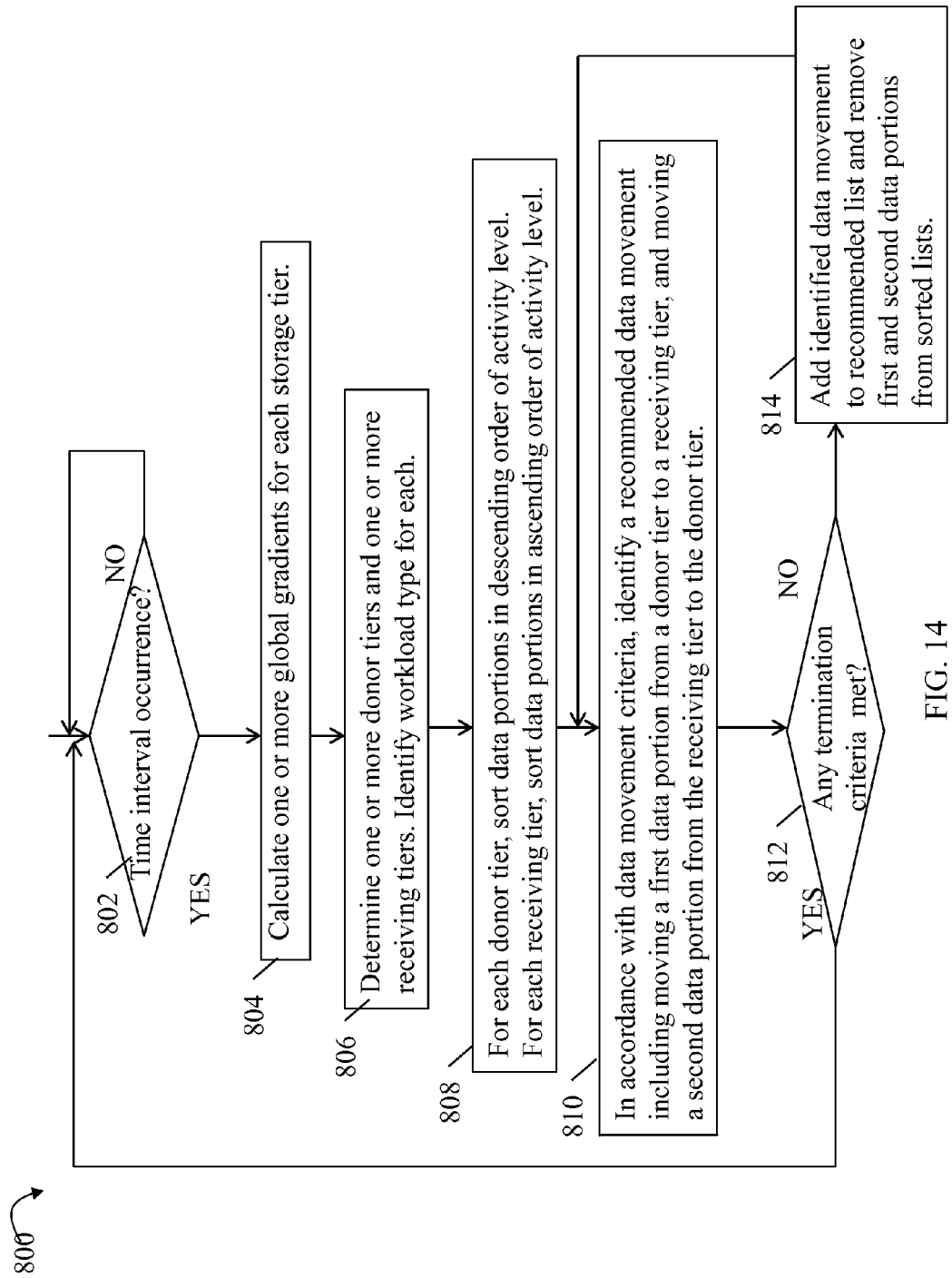
FIG. 14 is a flowchart of processing steps that may be performed in an embodiment in accordance with techniques herein.

Referring to FIG. 14, shown is a flowchart of processing steps that may be performed in an embodiment in accordance with techniques herein. The flowchart 800 summarizes processing described above. At step 802, a determination is made as to whether a time interval has occurred which triggers processing in accordance with techniques herein. As noted above, an embodiment may perform processing, for example, every 10 minutes to generate a list of recommended data movements such as may be used by the data storage optimizer to perform data movements in accordance with such recommendations. Control remains at step 802 until step 802 evaluates to yes. When step 802 evaluates to yes, control proceeds to step 804 where a set of one or more global gradients may be calculated for each storage tier. In step 806, one or more donor tiers are determined and one or more receiving tiers are determined. As described herein, step 806 may be performed using one or more global gradient for each tier. Additionally, the type of workload or workload characteristic(s) of the activity to be donated are determined. Similarly, for each receiving tier, the type of workload or workload characteristic(s) of the activity to be received are determined. For example, a donor tier may be a donor of writes rather than reads if the tier has a larger percentage of writes than reads and the data storage system or overall system RT will benefit more from donating a number of writes than reads. This may be the case, for example, where the DWG is larger than the DRG for the tier. It should be noted that a tier, such as a donor tier, may be characterized as a donor of writes but not reads in that the tier desires to primarily remove write activity but not read activity in connection with attaining the goal criteria. Similarly, a donor tier designated as a donor of reads may want to remove read activity in connection with attaining the goal criteria. A tier designated as a donor for a particular type of I/O or workload, such as reads or writes, denotes that it is preferred to remove that particular type of workload from that particular tier (rather than another tier which does not have the same designation). A tier designated as a receiver for a particular type of I/O or workload, such as reads or writes, denotes that it is preferred to add that particular type of workload to that particular tier (rather than another tier which does not have the same designation). Such designations are used in connection with processing as described herein to select pairs of data portions for a data movement (or swap) between a donor tier and a receiving tier. In connection with subsequent processing steps modeling data movements, all activity (e.g., reads and writes) of a data portion in a donor tier is modeled as being moved to a receiving tier and all activity of a data portion in a receiving tier is modeled as being moved to the donor tier to assess the impact upon the data storage system RT or goal criteria.

In step 808, for each donor tier, at least some data portions currently stored in the donor tier are sorted in descending order by decreasing activity level. Also in step 808, for each receiving tier at least some data portions currently stored in the receiving tier are sorted in ascending order by increasing activity level. The particular type of activity data examined for each data portion in the donor and receiving tiers may vary depending on what type of statistics are collected as well as whether the donor is tier is a designated donor of write and/or reads and whether the receiving tier is a designated receiver of reads and/or writes. For example, assume that a donor tier needs to donate write activity, then the activity information that may be used in sorting or prioritizing the list of data portions in the donor tier may relate to write activity, lithe donor tier is a donor of both reads and writes, then the activity information that may be used in sorting or prioritizing the list of data portions in the donor tier may relate to both read and write activity.

In accordance with data movement criteria, processing is performed in step 810 to identify a recommended data movement including moving a first data portion from a donor tier to a receiving tier, and moving a second data portion from the receiving tier to the donor tier. The data movement criteria may include meeting the goal criteria. Additionally, the data movement criteria may include other criteria used in connection with, for example, selecting a first receiving tier over one or more other receiving tiers (e.g., based on a matching between workload characteristics of a data portion from the donor tier and preferred workload characteristics specified for the first receiving tier) and/or selecting a particular data portion from one of the receiving tiers over other possible data portions also included in the receiving tier, and the like. Step 810 may include modeling one or more potential data movements to select one of the considered data movements as a recommended data movement. As described herein, step 810 may include evaluating multiple potential data movements each involving the same data portion from the donor tier and a different second data portion from a receiving tier. Such evaluation may include modeling performance of a data movement to determine an expected impact of the data movement with respect to one or more goal criteria. As described herein, the modeling may be performed by modeling movement of all activity of the data portions (e.g., modeling movement of the read and write activity of the first portion from the donor to receiving tier and modeling movement of the read and write activity of the second portion from the receiving to the donor tier).

A determination is made in step 812 as to whether any termination criteria has been met. As described herein, termination criteria may include, for example, failure to identify a data movement in step 810 due to inability to determine a data movement meeting the goal criteria or exhaustion of data portions in the donor and/or receiving tiers. Termination criteria may also include having determined a sufficient number of recommended data movements based on an amount of data to be moved. If step 812 evaluates to no, control proceeds to step 814 to add the identified data movement from step 810 to the recommended list of data movements and to remove the first and second portions selected in step 810 from the sorted tier lists of data portions. Removing data portions from the lists may provide for removing the data portions from further consideration in evaluating other potential data movements. From step 814, control proceeds to step 810 to identify another data movement. If step 812 evaluates to yes, control proceeds to step 802 to await the next time interval occurrence.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of determining data movements comprising:
   calculating a plurality of gradient sets for a plurality of storage tiers, wherein each of the plurality of gradient sets is associated with one of the plurality of storage tiers and includes at least one gradient for said one storage tier;
   selecting, based on the plurality of gradient sets, a donor tier from the plurality of storage tiers;
   selecting, based on the plurality of gradient sets, a first set of one or more receiving tiers from the plurality of storage tiers;
   selecting a first data portion of the donor tier;
   selecting, in accordance with data movement criteria, a second data portion included in a receiving tier of the first set, wherein said selecting the second data portion comprises modeling a first data movement including moving the first data portion from the donor tier to the receiving tier; and
   performing the first data movement.

2. The method of claim 1, wherein the first data portion is a data portion for an application having its data stored on the plurality of storage tiers and said data movement criteria includes a first goal identifying a response time goal for any of the application and a data storage system including the plurality of tiers.

3. The method of claim 2, wherein the response time goal identifies a threshold response time for the application, and wherein modeling the first data movement includes determining a modeled application response time that simulates a response time for the application with respect to data of the application stored on any of the plurality of storage tiers, and wherein said selecting the second data portion includes determining whether the modeled application response time is an improvement with respect to the response time goal and with respect to a current application response time denoting a response time without performing the first data movement.

4. The method of claim 2, wherein the response time goal identifies a response time goal for the data storage system, and wherein modeling the first data movement includes determining a modeled data storage system response time that simulates a response time for the data storage system, and wherein said selecting the second data portion includes determining whether the modeled data storage system response time is an improvement with respect to the response time goal for the data storage system and with respect to a current data storage system response time denoting a response time for the data storage system without performing the first data movement.

5. The method of claim 2, wherein the data movement criteria includes determining whether a first set of one or more workload characteristics of any of the donor tier and the first data portion match a second set of one or more characteristics preferred for the receiving tier, and wherein the first set of one or more workload characteristics include any of whether write activity of the first data portion is above a threshold level, whether read activity of the first data portion is above a threshold level, and whether activity of the first data portion identifies any of a sequential read or write pattern.

6. The method of claim 1, further comprising:
   ranking relative activity levels of at least some of the data portions currently stored in the donor tier based on decreasing activity level associated with each of the at least some data portions, said at least some data portions including the first data portion.

7. The method of claim 6, wherein the ranking ranks any of read activity data and write activity data of the at least some data portions.

8. The method of claim 7, wherein each of the plurality of gradient sets associated with one of the plurality of storage tiers includes any of a first gradient denoting a change in response time across said plurality of storage tiers with respect to an increase in read activity in said one storage tier by a specified amount, a second gradient denoting a change in response time across said plurality of storage tiers with respect to a decrease in read activity in said one storage tier by a specified amount, a third gradient denoting a change in response time across said plurality of storage tiers with respect to an increase in write activity in said one storage tier by a specified amount, and a fourth gradient denoting a change in response time across said plurality of storage tiers with respect to a decrease in write activity in said one storage tier by a specified amount.

9. The method of claim 8, wherein modeling the first data movement of the first data portion from the donor tier to the receiving tier includes modeling movement of first read activity data and first write activity data of the first data portion to the receiving tier using a first of the plurality of gradient sets associated with the donor tier and a second of the plurality of gradient sets associated with the receiving tier.

10. The method of claim 1, wherein said first set of one or more receiving tiers includes at least two of the plurality of tiers and wherein selecting the second data portion from a receiving tier of the first set includes modeling data movement of the first data portion from the donor tier to each of the tiers in the first set.

11. The method of claim 1, wherein the first data movement includes moving the second data portion from the receiving tier to the donor tier and modeling the first data movement includes modeling movement of the second data portion from the receiving tier to the donor tier, and wherein performing the first data movement includes moving the second data portion from the receiving tier to the donor tier.

12. The method of claim 11, further comprising:
ranking relative activity levels of at least some of the data portions currently stored in the receiving tier based on increasing activity level associated with each of the at least some data portions, said at least some data portions including the second data portion, and wherein the ranking ranks any of read activity data and write activity data of the at least some data portions.

13. The method of claim 12, wherein each of the plurality of gradient sets associated with one of the plurality of storage tiers includes any of a first gradient denoting a change in response time across said plurality of storage tiers with respect to an increase in read activity in said each storage tier by a specified amount, a second gradient denoting a change in response time across said plurality of storage tiers with respect to a decrease in read activity in said each storage tier by a specified amount, a third gradient denoting a change in response time across said plurality of storage tiers with respect to an increase in write activity in said each storage tier by a specified amount, and a fourth gradient denoting a change in response time across said plurality of storage tiers with respect to a decrease in write activity in said each storage tier by a specified amount.

14. The method of claim 13, wherein modeling the first data movement includes modeling movement of first read activity data and first write activity data of the first data portion to the receiving tier and modeling movement of second read activity data and second write activity data of the second data portion to the donor tier, and wherein modeling the first data movement uses a first of the plurality of gradient sets associated with the donor tier and a second of the plurality of donor sets associated with the receiving tier.

15. The method of claim 1, wherein the second data portion is an empty data portion denoting an unused amount of physical storage of the receiving tier having no I/O activity.

16. A data storage system comprising:
a plurality of storage tiers;
a plurality of physical devices, wherein each of the plurality of storage tiers includes a different portion of the plurality of physical devices;
a computer readable medium comprising code stored thereon for determining a list of one or more data movements, the computer readable medium comprising code stored thereon for:
calculating a plurality of gradient sets for the plurality of storage tiers, wherein each of the plurality of gradient sets is associated with one of the plurality of storage tiers and includes at least one gradient for said each storage tier;
selecting, based on the plurality of gradient sets, a donor tier from the plurality of storage tiers;
selecting, based on the plurality of gradient sets, a first set of one or more receiving tiers from the plurality of storage tiers;
selecting a first data portion having data currently stored on at least one physical device of the donor tier; and
selecting, in accordance with data movement criteria, a second data portion included in a receiving tier of the first set, wherein said selecting the second data portion includes modeling a first data movement including moving the first data portion from the donor tier to the receiving tier and moving the second data portion from the receiving tier to the donor tier, wherein said first data movement is included in said list.

17. The data storage system of claim 16, wherein the list of one or more data movements is used by a data storage optimizer to perform data movement optimizations in accordance with the list.

18. The data storage system of claim 16, wherein the donor tier is designated as a tier that prefers to donate at least one of reads and writes, and each of the receiving tiers in the first set is designated as tier that prefers to receive at least one of reads and writes, and wherein the data movement criteria includes one or more goal criteria, said goal criteria comprising any of a response time goal, an availability goal, and a storage capacity goal.

19. The data storage system of claim 17, wherein the donor tier is designated as donor of one of read activity and write activity thereby indicating that the donor tier has excessive workload of said one of read activity and write activity, and wherein the donor tier has a steepest gradient of all others of said plurality of tiers with respect to gradients in said plurality of gradient sets associated with said one of read activity and write activity, and a first of the plurality of gradient sets associated with the donor tier and a second of the plurality of gradient sets associated with the receiving tier are used in modeling the first data movement.

20. A computer readable medium comprising code stored thereon for determining a list of one or more data movements, the computer readable medium comprising code stored thereon for:
calculating a plurality of gradient sets for a plurality of storage tiers, wherein each of the plurality of gradient sets is associated with one of the plurality of storage tiers and includes at least one gradient for said each storage tier;
selecting, based on the plurality of gradient sets, a donor tier from the plurality of storage tiers;
selecting, based on the plurality of gradient sets, a first set of one or more receiving tiers from the plurality of storage tiers;
selecting a first data portion having data currently stored on at least one physical device of the donor tier; and
selecting, in accordance with data movement criteria, a second data portion included in a receiving tier of the first set, wherein said selecting the second data portion includes modeling a first data movement including moving the first data portion from the donor tier to the receiving tier and moving the second data portion from the receiving tier to the donor tier, wherein said first data movement is included in said list.

* * * * *